US009776320B2

(12) United States Patent
Nishita

(10) Patent No.: US 9,776,320 B2
(45) Date of Patent: Oct. 3, 2017

(54) MEASUREMENT AND INSTALLATION DATA INDICATING APPARATUS AND MEASUREMENT AND INSTALLATION DATA INDICATING METHOD

(71) Applicant: Kabushiki Kaisha TOPCON, Tokyo (JP)

(72) Inventor: Nobuyuki Nishita, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 15/506,434

(22) PCT Filed: Aug. 4, 2015

(86) PCT No.: PCT/JP2015/072130
§ 371 (c)(1),
(2) Date: Feb. 24, 2017

(87) PCT Pub. No.: WO2016/031504
PCT Pub. Date: Mar. 3, 2016

(65) Prior Publication Data
US 2017/0252918 A1     Sep. 7, 2017

(30) Foreign Application Priority Data
Aug. 28, 2014    (JP) ................................. 2014-174301

(51) Int. Cl.
*G01C 15/00*     (2006.01)
*B25H 7/04*      (2006.01)
*G01C 15/02*     (2006.01)

(52) U.S. Cl.
CPC .............. *B25H 7/04* (2013.01); *G01C 15/02* (2013.01)

(58) Field of Classification Search
CPC .................................. G01C 15/02; B25H 7/04
(Continued)

(56) References Cited

U.S. PATENT DOCUMENTS 8,605,274 B2 * 12/2013 Schumacher ........ G01C 15/004
33/228
9,605,957 B2 *  3/2017 Nishita ................... G01C 5/00
(Continued)

FOREIGN PATENT DOCUMENTS

JP    2007-288295    11/2007
JP    2008-224516     9/2008
(Continued)

OTHER PUBLICATIONS

International Search Report dated Nov. 2, 2015 in International (PCT) Application No. PCT/JP2015/072130.
(Continued)

*Primary Examiner* — Yaritza Guadalupe-McCall
(74) *Attorney, Agent, or Firm* — Wenderoth, Lind & Ponack, L.L.P.

(57) ABSTRACT

A measurement and installation data indicating apparatus including a distance image sensor that obtains distance image data in a predetermined range, a projector that projects an image on a projection plane in a predetermined range, an inclination data obtaining part that obtains inclination data on a detection optical axis and a projection optical axis relative to a vertical direction, a positional data obtaining part that obtains coordinate data on a present position and a target position, and a terminal controller that generates, based on the coordinate data, a target information image related to the target position and seen from the present position. The terminal controller corrects the target information image to fit to a shape of the projection plane based on the distance image data and the inclination data, and projects the corrected target information image by the projector.

15 Claims, 23 Drawing Sheets

(58) Field of Classification Search
USPC .................................................. 33/228, 290
See application file for complete search history.

(56) References Cited

U.S. PATENT DOCUMENTS

| | | | |
|---|---|---|---|
| 2012/0272537 A1* | 11/2012 | Nishita | ................ G01C 15/008 |
| | | | 33/293 |
| 2014/0247439 A1* | 9/2014 | Neier | ................... G01C 15/002 |
| | | | 356/4.01 |
| 2014/0268064 A1 | 9/2014 | Kahle et al. | |
| 2015/0334362 A1 | 11/2015 | Kahle et al. | |
| 2016/0216110 A1* | 7/2016 | Nishita | .................... G01C 3/08 |
| 2017/0082748 A1* | 3/2017 | Nishita | .................... G01S 17/48 |
| 2017/0167870 A1* | 6/2017 | Nishita | .................. G01C 11/04 |

FOREIGN PATENT DOCUMENTS

| | | |
|---|---|---|
| JP | 2010-250560 | 11/2010 |
| JP | 2012-233770 | 11/2012 |
| WO | 2014/159768 | 10/2014 |

OTHER PUBLICATIONS

Jun Shimamura et al., "Location-Aware Projection within Dynamic Real Environment", Transactions of the Virtual Reality Society of Japan, Jun. 30, 2005, vol. 10, No. 2, pp. 145-153, with English abstract.

* cited by examiner

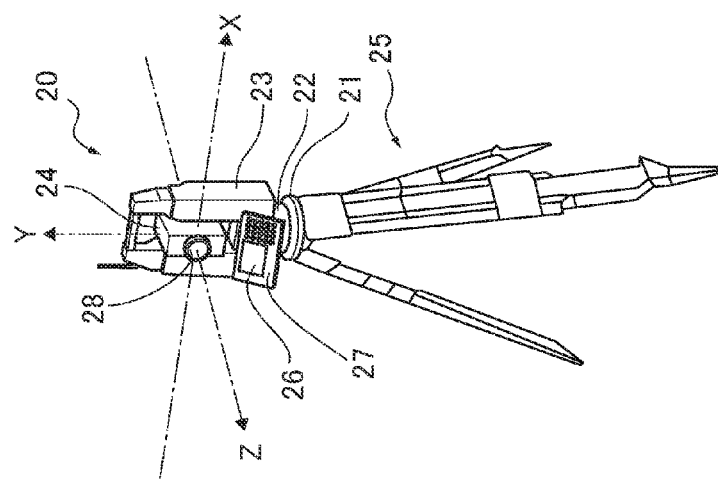
FIG.6
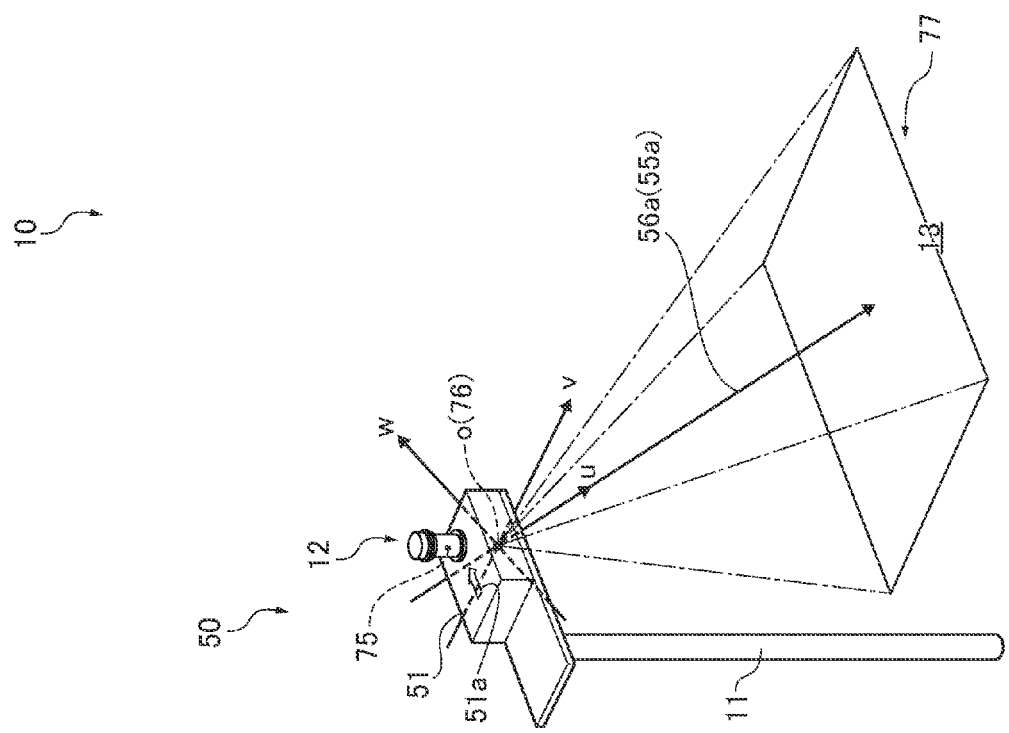

MEASUREMENT AND INSTALLATION DATA INDICATING APPARATUS AND MEASUREMENT AND INSTALLATION DATA INDICATING METHOD

TECHNICAL FIELD

The present invention relates to a measurement and installation data indicating apparatus and a measurement and installation data indicating method.

BACKGROUND ART

In surveying, for example, a measurement and installation operation which marks by piling at a predetermined point is performed with a surveying instrument for measuring a distance such as a total station. In this measurement and installation operation, the surveying is performed by the surveying instrument, piling is performed by guiding an operator to a target measurement and installation point (target position), the surveying is again performed with the surveying instrument, and then the piling is again performed by guiding the operator to another measurement and installation point (target position). At this time, the operator moves a target (reflector) such as a corner cube prism attached to a pole as a collimation target, which is a reference for positioning by surveying, to a predetermined horizontal coordinate position according to the guide based on the surveying. The operator then identifies the position just under the horizontal coordinate position with a bubble tube provided in the pole to measure an appropriate measurement and installation point (target position) and to perform the piling.

It is not easy to identify the position just below the target moved to a predetermined horizontal coordinate position with the above-described method. A measurement and installation point marking apparatus, which marks an appropriate measurement and installation point (target position) with a laser pointer, has been therefore proposed (refer to Patent Literature 1, for example). Such a measurement and installation point marking apparatus allows the laser pointer to mark the position just below the target or an arbitrary position with the position of the target as a reference regardless of the inclination of the pole. It is thus easy to measure the appropriate measurement and installation point (target position) with the measurement and installation point marking apparatus.

CITATION LIST

Patent Literature

Patent Literature 1: JP2012-233770A

SUMMARY

Technical Problem

When the measurement and installation point marking apparatus marks, with the laser pointer, an arbitrary position with the position of the target as a reference, however, the marked position is shifted from the appropriate measurement and installation point (target position) due to irregularity of a land to be marked. When the measurement and installation point marking apparatus marks, with the laser pointer, the position just below the target, it is necessary to move the target to a position right above (upper position in vertical direction) the appropriate measurement and installation point (target position). For this reason, the measurement and installation point marking apparatus is required to be improved to easily and appropriately measure the measurement and installation point (target position).

The present invention has been made in view of the above circumferences, and an object of the present invention is to provide a measurement and installation data indicating apparatus and a measurement and installation data indicating method capable of easily and appropriately measuring a target position.

Solution to Problem

To solve the above problem, a measurement and installation data indicating apparatus of the present invention includes a distance image sensor that obtains distance image data in a predetermined range centered at a detection optical axis, a projector that projects an image on a projection plane in a predetermined range centered at a projection optical axis, an inclination data obtaining part that obtains inclination data on the detection optical axis and the projection optical axis relative to a vertical direction, a positional data obtaining part that obtains coordinate data on a present position and a target position, and a terminal controller that generates, based on the coordinate data, a target information image related to the target position and seen from the present position. The terminal controller corrects the target information image to fit to a shape of the projection plane based on the distance image data obtained by the distance image sensor and the inclination data obtained by the inclination data obtaining part, and projects the corrected target information image by the projector.

Advantageous Effects

According to the measurement and installation data indicating apparatus of the present invention, the target position is easily and appropriately measured.

BRIEF DESCRIPTION OF DRAWINGS

FIG. 6 is a schematic view describing a concept of axis directions (u, v, w axes) of an inclination sensor 54 in the measurement and installation data indicating apparatus 50 and coordinate axes (X, Y, Z axes) in the surveying instrument 20.

DESCRIPTION OF EMBODIMENTS

Hereinafter, an embodiment of a measurement and installation data indicating apparatus and a measurement and installation indicating data method according to the present invention will be described with reference to the drawings.
Embodiment 1

Figure 1:
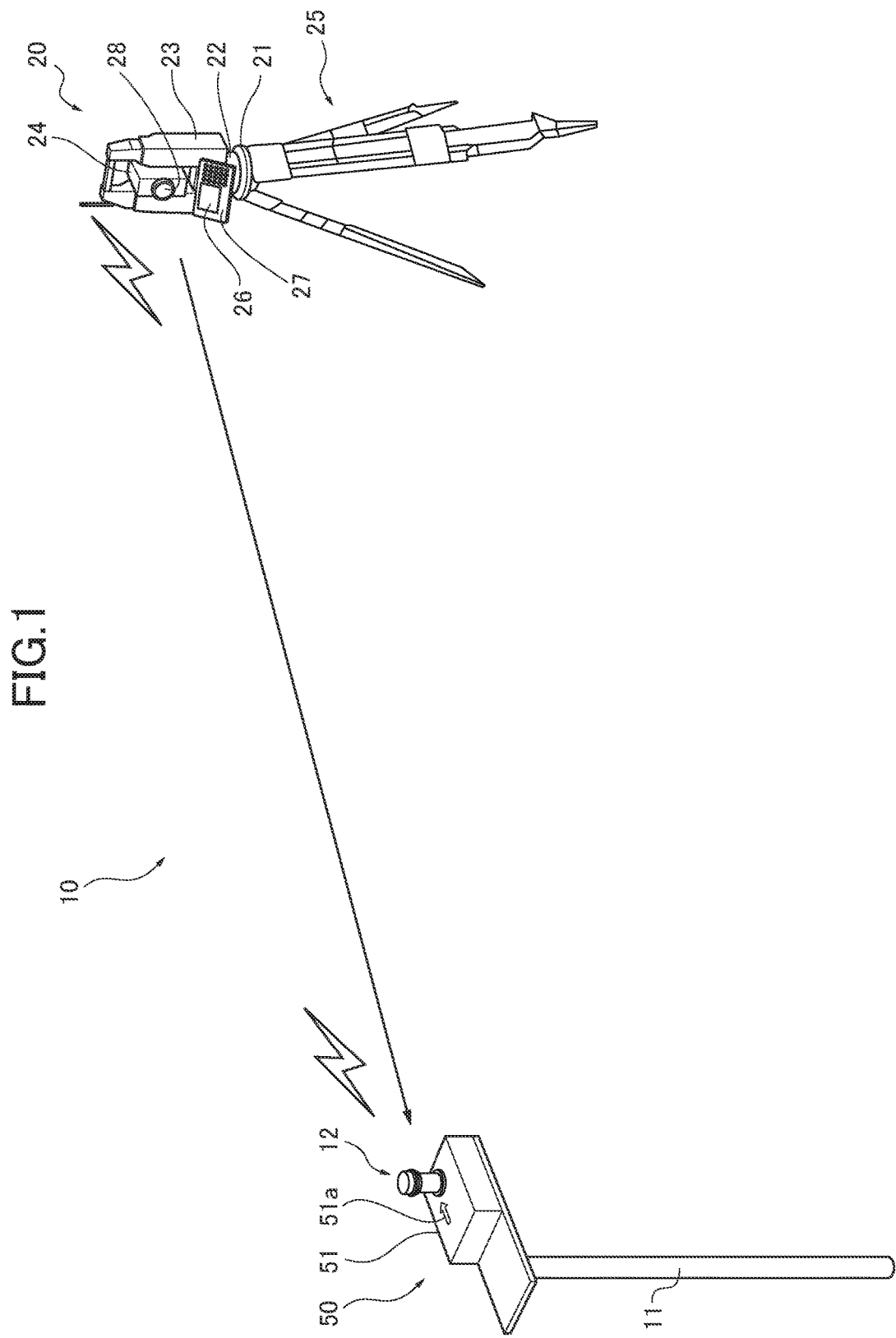
FIG. 1 is a schematic view illustrating a configuration of a surveying system 10 using a measurement and installation data indicating apparatus 50 and a surveying instrument 20 in Embodiment 1 as one example of a measurement and installation data indicating apparatus according to the present invention.

A general configuration of a surveying system 10 with a measurement and installation data indicating apparatus 50 as one example of a measurement and installation data indicating apparatus according to the present invention will be described. As illustrated in FIG. 1, the surveying system 10 allows an operator to measure an accurate position (point) of a target position (for example, measurement and installation point 72) by guiding the operator holding the measurement and installation data indicating apparatus 50 from the position (present position) of the measurement and installation data indicating apparatus 50 measured by the surveying instrument 20 to the target position (for example, measurement and installation point 72). The measurement and installation data indicating apparatus 50 is configured to easily measure the accurate position (point) of the target position (for example, measurement and installation point 72). The target position includes, in addition to the measurement and installation point 72, a structure in a road and a building. The structure includes a pipe, an electric installation, and an installation in a road (including planned road) and a building (including building under construction), or a window and a handrail in a building (including building under construction). For example, the position and the shape of the structure are shown as coordinate data on figures.

As illustrated in FIG. 1, the surveying instrument 20 is a total station in Embodiment 1, and is installed at a known point. The surveying instrument 20 projects a pulse laser beam to a measurement point, receives the pulse laser beam (pulse reflection light) reflected from the measurement point, and measures a distance with respect to each pulse, so as to perform distance measurement with high accuracy by averaging the distance measurement results. The surveying instrument 20 is not limited to that in Embodiment 1. The surveying instrument 20 may adopt a phase difference measurement method using a light beam modulated by a predetermined frequency or another method. The surveying instrument 20 includes a leveling part 21, a base part 22, a frame part 23, a telescope part 24, and a tripod 25.

The leveling part 21 is mounted on the tripod 25. The base part 22 is provided in the leveling part 21 to change an inclination angle relative to the leveling part 21. The frame part 23 is provided in the base part 22 to be rotatable about a vertical axis relative to the base part 22. The frame part 23 is provided with a display 26 and an operation part 27. The operation part 27 is operated to use various functions in the surveying instrument 20. The operation part 27 outputs the input data to a surveying instrument controller 37 (refer to FIG. 2).

The telescope part 24 is provided in the frame part 23 to be rotatable about a horizontal axis relative to the frame part 23. The telescope part 24 includes a telescope 28 that collimates a measurement target and an imaging part 29 (refer to FIG. 2) that obtains an image (telescope image) in the collimation direction through an optical system of the telescope 28. For example, a digital camera that outputs an image as digital image signals is used for the imaging part 29. A distance measurement part 31 and a tracking part 32 (refer to FIG. 2), which share the optical system of the telescope 28, are built in the telescope part 24. The distance measurement part 31 projects measurement light and receives the light reflected from a measurement target (target 12) to measure a distance to the measurement target with light wave. The tracking part 32 projects tracking light and receives the light reflected from a tracking target (target 12) to detect the position of the tracking target.

Figure 2:
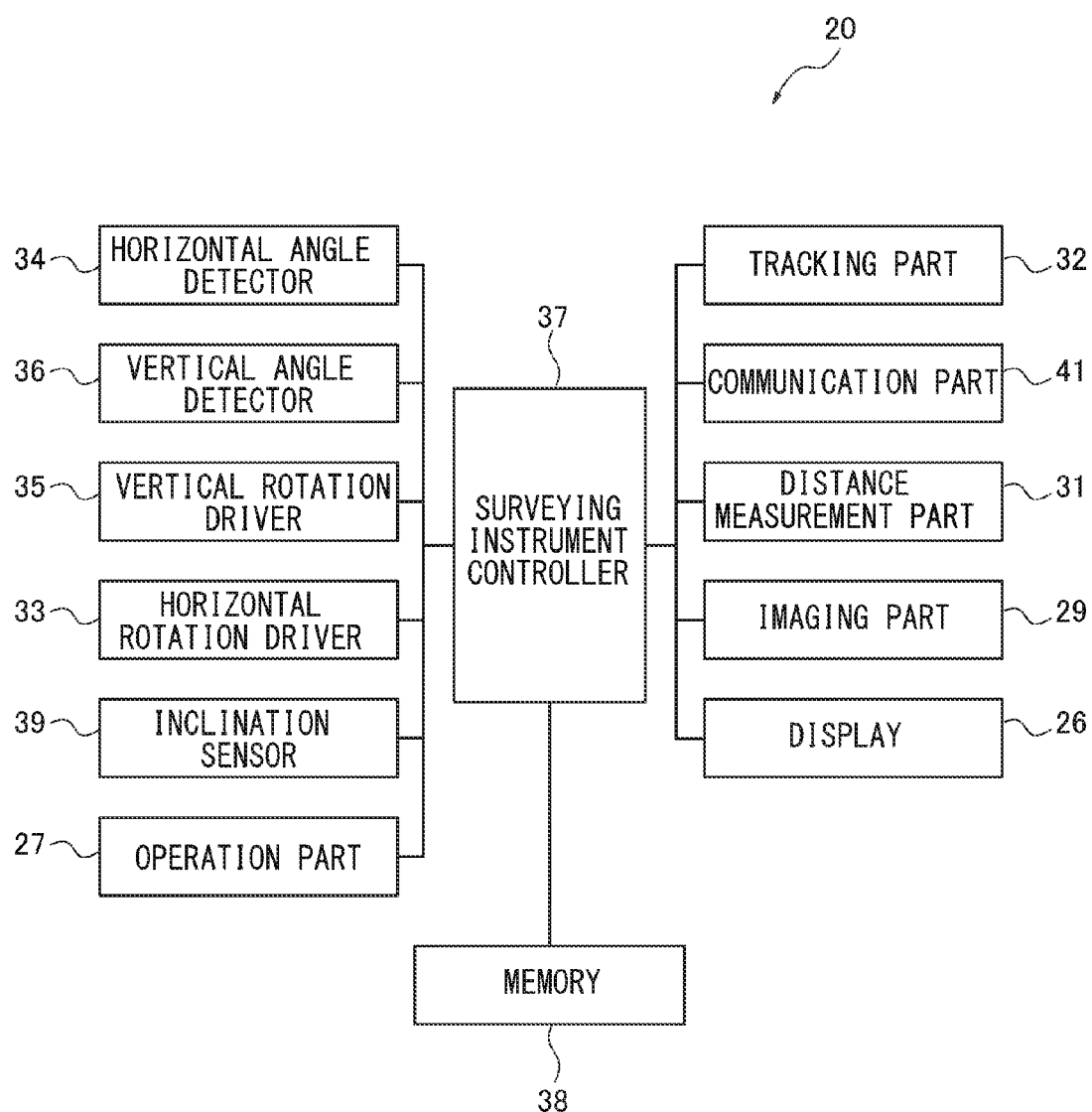
FIG. 2 is a block diagram showing an internal configuration of the surveying instrument 20.

The frame part 23 that allows the telescope part 24 to rotate about the horizontal axis is provided with a horizontal rotation driver 33 and a horizontal angle detector 34 (refer to FIG. 2). The horizontal rotation driver 33 rotates the frame part 23 about the vertical axis, namely, in the horizontal direction relative to the base part 22. The horizontal angle detector 34 detects the horizontal rotation angle of the frame part 23 relative to the base part 22 to detect a horizontal angle in the collimation direction (angle measurement).

The frame part 23 is provided with a vertical rotation driver 35 and a vertical angle detector 36 (refer to FIG. 2). The vertical rotation driver 35 rotates the telescope part 24 about the horizontal axis, namely, in the vertical direction relative to the frame part 23. The vertical angle detector 36 detects the vertical angle of the telescope part 24 relative to the frame part 23 to detect the vertical angle in the collimation direction (angle measurement).

The surveying instrument controller 37 (refer to FIG. 2) is built in the frame part 23. The surveying instrument controller 37 controls the operation of the surveying instrument 20 based on a program stored in a connected memory 38 (refer to FIG. 2). The memory 38 stores various programs such as a calculation program required for measurement, a calculation program required for tracking, a program for an image process, and a program for generating data and sending the data. The data is appropriately sent to a terminal controller 52 (communication part 57 (refer to FIG. 4)) of the measurement and installation data indicating apparatus 50 through a communication part 41 (refer to FIG. 2).

As illustrated in FIG. 2, the display 26, the operation part 27, the imaging part 29, the distance measurement part 31, the tracking part 32, the horizontal rotation driver 33, the horizontal angle detector 34, the vertical rotation driver 35, the vertical angle detector 36, the memory 38, an inclination sensor 39, and the communication part 41 are connected to the surveying instrument controller 37.

The inclination sensor 39 detects an inclination of the surveying instrument 20 (telescope part 24 (refer to FIG. 1)). The inclination sensor 39 is provided in the leveling part 21 (refer to FIG. 1), and detects an inclination of the leveling part 21 relative to a horizontal plane to detect the inclination of the surveying instrument 20 (telescope part 24) in Embodiment 1. The inclination sensor 39 outputs the detected inclination (data) of the surveying instrument 20 (telescope part 24) to the surveying instrument controller 37. The inclination sensor 39 may be provided in the frame part 23 or in another part as long as the inclination sensor 39 detects the inclination of the surveying instrument 20 (telescope part 24). The inclination sensor 39 is not limited to the configuration in Embodiment 1.

The communication part 41 establishes communication between the terminal controller 52 (refer to FIG. 4) and the surveying instrument controller 37 through the communication part 57 (refer to FIG. 4) of the measurement and installation data indicating apparatus 50, and appropriately sends various data stored in the memory 38 under the control of the surveying instrument controller 37. In Embodiment 1, the communication part 41 establishes wireless communication. The surveying instrument controller 37 thereby exchanges data with the terminal controller 52 (communication part 57 (refer to FIG. 4)) by wireless communication through the communication part 41.

The output values for measurement are input to the surveying instrument controller 37 from the distance measurement part 31, the tracking part 32, the horizontal angle detector 34, the vertical angle detector 36, and the inclination sensor 39. The surveying instrument controller 37 measures (calculates) a distance, a vertical angle, and a horizontal angle based on the output values, stores the measurement results in the memory 38, and displays the measurement results on the display 26. The measurement results are appropriately sent to the terminal controller 52 (communication part 57 (refer to FIG. 4)) through the communication part 41.

The image obtained (imaged) by the imaging part 29 is stored in the memory 38, and is displayed on the display 26. The surveying instrument controller 37 appropriately performs an image process to the image (image obtained by imaging part 29) stored in the memory 38, stores the image in the memory 38, and displays the image on the display 26.

The surveying instrument controller 37 controls the driving of the horizontal rotation driver 33 and the vertical rotation driver 35 to appropriately rotate the frame part 23 and the telescope part 24 (refer to FIG. 1). The telescope part 24 is thereby directed in a predetermined direction to scan a predetermined range. The surveying instrument controller 37 controls the distance measurement part 31 to measure a distance to a predetermined measurement target (target 12) (distance measurement). At this point, the surveying instrument controller 37 measures the three-dimensional coordinate position of the measurement target (target 12) by measuring (calculating) a vertical angle and a horizontal angle in the collimation direction. The surveying instrument controller 37 generates present coordinate data 75 as the coordinate data on the present position of the measurement target based on the measured three-dimensional coordinate position of the measurement target (target 12 (center position)), and appropriately sends the present coordinate data 75 to the terminal controller 52 (communication part 57 (refer to FIG. 4)) through the communication part 41. The surveying instrument controller 37 controls the driving of the horizontal rotation driver 33 and the vertical rotation driver 35 based on the data on the position of the tracking target (target 12) from the tracking part 32 to direct (track) the telescope part 24 (refer to FIG. 1) in the direction of the tracking target (target 12). In the surveying instrument 20, the leveling part 21, the base part 22, the frame part 23, the telescope part 24, the tripod 25, the telescope 28 (imaging part 29), the distance measurement part 31, the tracking part 32, the horizontal rotation driver 33, the horizontal angle detector 34, the vertical rotation driver 35, the vertical angle detector 36, and the inclination sensor 39 operate as a surveying unit that is driven and controlled by the surveying instrument controller 37.

Target coordinate data 71 (refer to FIG. 5) as the coordinate data on the target position is input to the surveying instrument controller 37. The surveying instrument controller 37 stores the target coordinate data 71 in the memory 38, and displays the target coordinate data 71 on the display 26. The target coordinate data 71 is input from an external device through the communication part 41, from an external device connected to the surveying instrument controller 37 (surveying instrument 20), or by the operation to the operation part 27. The target coordinate data 71 will be described later. The surveying instrument controller 37 appropriately sends the target coordinate data 71 to the terminal controller 52 (communication part 57 (refer to FIG. 4)) through the communication part 41. The present position (three-dimensional coordinate position) of the measurement and installation data indicating apparatus 50 is measured, and the coordinate data as the measurement result is appropriately sent to the terminal controller 52 of the measurement and installation data indicating apparatus 50 by the surveying instrument 20.

As illustrated in FIG. 1, in Embodiment 1, the measurement and installation data indicating apparatus 50 is housed in a box casing 51. The casing 51 is attached to the upper end of a surveying pole 11. The casing 51 (measurement and installation data indicating apparatus 50) projects in the direction orthogonal to the extending direction of the surveying pole 11. The surveying pole 11 is a bar, and the operator holds the surveying pole 11 to move the surveying pole 11 together with the measurement and installation data indicating apparatus 50.

Figure 3:
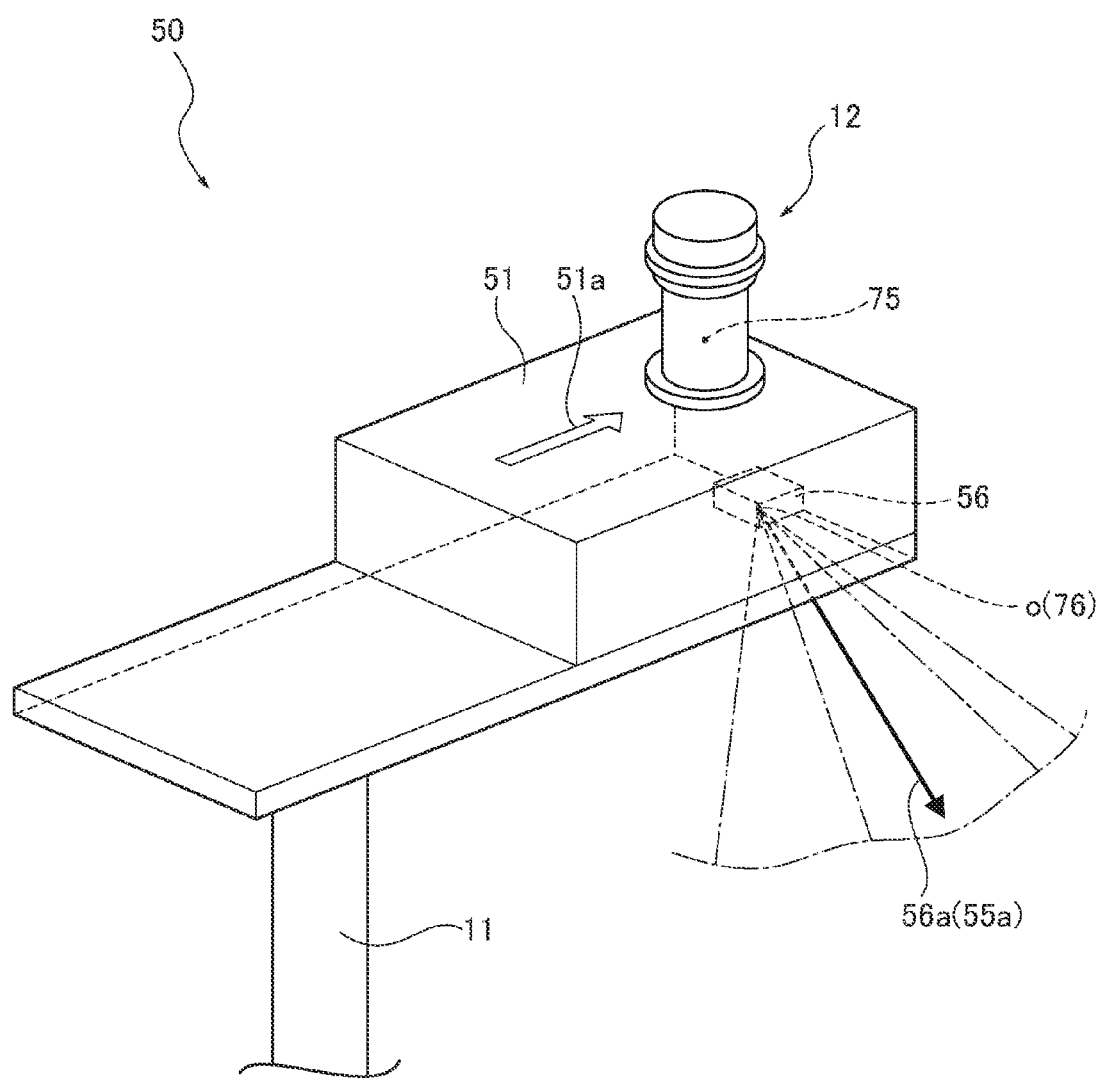
FIG. 3 is a schematic view illustrating a configuration of the measurement and installation data indicating apparatus 50.

As illustrated in FIG. 3, in the measurement and installation data indicating apparatus 50, the target 12 is provided in the upper end of the casing 51. The target 12 includes in the entire circumference thereof a plurality of corner cube prism. Namely, the target 12 is an all-around (360°) prism. The target 12 thereby reflects, on the entire circumference (360°), light (measurement light and tracking light) along all incident directions. The target 12 is therefore a measurement target whose position is measured by reflecting the measurement light from the distance measurement part 31 of the surveying instrument 20, and also is a tracking target to which the telescope part 24 is always directed (tracking target is tracked) by reflecting the tracking light from the tracking part 32 of the surveying instrument 20. In the surveying instrument 20, the coordinate position (three-dimensional coordinate position) of the target 12 (center position (center position of a plurality of corner cubes)) is measured by the distance measurement part 31, and the present coordinate data 75 as the coordinate data on the present position of the target 12 (center position) is obtained. In the surveying instrument 20, the telescope part 24 is always directed to the target 12 (center position) by the tracking part 32 (target is tracked). As the target 12 is fixed to the casing 51, the positional relationship between the center position of the target 12 and the casing 51 is constant.

In the measurement and installation data indicating apparatus 50, the terminal controller 52 (refer to FIG. 4) is provided inside the casing 51. The terminal controller 52 controls the operation of the measurement and installation data indicating apparatus 50 based on the program stored in the memory 53. The memory 53 stores various programs such as an image process program required for generating a target information image 77 (refer to FIG. 6), and an image process program required for fitting the target information image 77 to a projection plane 13 (refer to FIG. 6).

Figure 4:
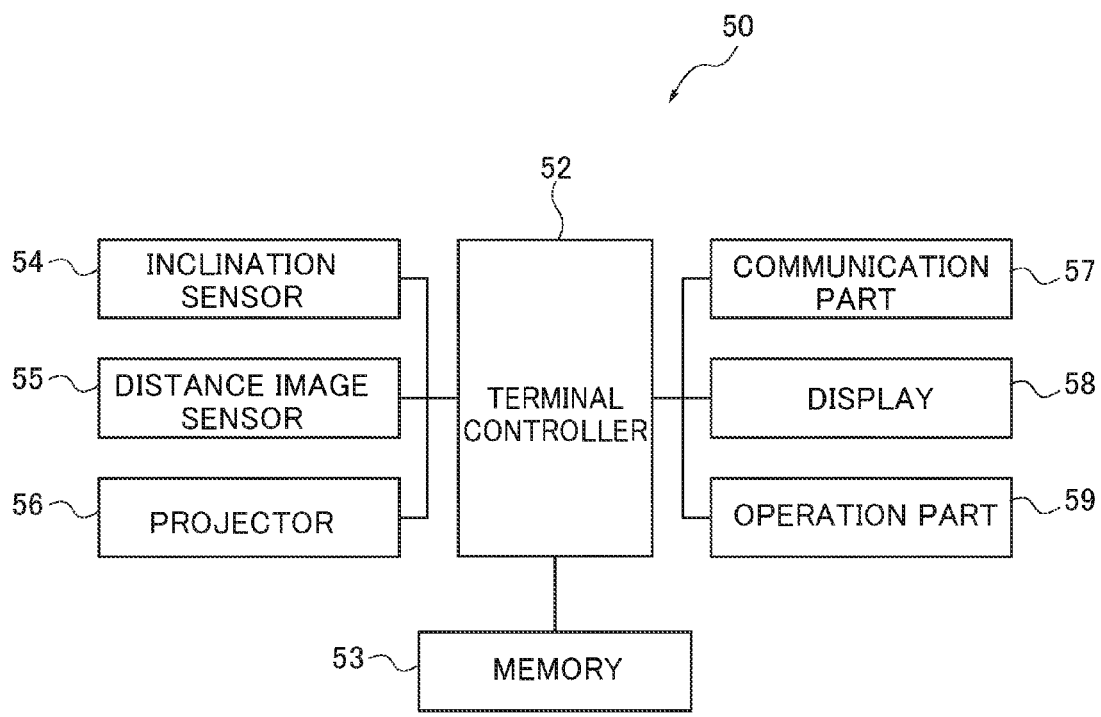
FIG. 4 is a block diagram showing an internal configuration of the measurement and installation data indicating apparatus 50.

As illustrated in FIG. 4, an inclination sensor 54, a distance image sensor 55, a projector 56, a communication part 57, a display 58, and an operation part 59 are connected to the terminal controller 52. The terminal controller 52 controls the operation of the inclination sensor 54, the distance image sensor 55, the projector 56, the communication part 57, the display 58, and the operation part 59. Inclination data 61 on the inclination detected by the inclination sensor 54, distance image data 62 on the three-dimensional shape of the projection plane 13 (refer to FIG. 6) obtained by the distance image sensor 55, and operation data performed to the operation part 59 are input to the terminal controller 52. The terminal controller 52 projects the generated target information image 77 to the projection plane 13 by driving the projector 56 (refer to FIGS. 6 and 8).

The inclination sensor 54 detects an inclination of the measurement and installation data indicating apparatus 50. In Embodiment 1, the inclination sensor 54 is a three-axis acceleration sensor, which detects acceleration in three directions of u, v, w axes (refer to FIG. 6) orthogonal to each other. The inclination sensor 54 is fixed to the casing 51. The inclination sensor 54 detects the inclination of the measurement and installation data indicating apparatus 50 with reference to the horizontal plane or the vertical direction by detecting the inclination of the casing 51 relative to the horizontal plane, and obtains inclination on 61 (refer to FIG. 12) on the inclination. A reference direction 51a is set to the casing 51 to detect the inclination of the casing 51 (measurement and installation data indicating apparatus 50), and is a direction toward the target 12 from the surveying pole 11 on the surface of the casing 51 in the example illustrated in FIG. 3. In Embodiment 1, one axis (for example, u axis (refer to FIG. 6)) of the detectable three axes of the inclination sensor 54 is aligned with a detection optical axis 55a of the distance image sensor 55 and a projection optical axis 56a of the projector 56.

The distance image sensor 55 obtains a three-dimensional structure in a predetermined range centered at the detection optical axis 55a (refer to FIG. 3). More specifically, the distance image sensor 55 detects a distance (one-dimension) in the direction (one-dimension) of the detection optical axis 55a with respect to each detection point in a predetermined range on the plane (two-dimension) intersecting with the detection optical axis 55a. Such a distance image sensor 55 uses various known methods such as a stereo method using two cameras (imaging elements), a lens focal point method using a blur level and focus adjustment of a lens, a light traveling time method of obtaining a distance based on a time from light projection to an object to light reflection, and a pattern light projection method of obtaining a distance based on a distortion level of pattern light in a reflection image obtained by projecting predetermined pattern light to an object. As the detailed calculation of the distance is known, the description thereof will be omitted. In Embodiment 1, the distance image sensor 55 uses the light traveling time method. The distance image sensor 55 is driven under the control of the terminal controller 52 to detect the three-dimensional structure in a predetermined range centered at the detection optical axis 55a. The distance image sensor 55 thereby obtains distance image data 62 (refer to FIG. 12) on the three-dimensional structure. The distance image sensor 55 outputs the obtained distance image data 62 (three-dimensional structure) to the terminal controller 52. The predetermined range centered at the detection optical axis 55a includes a predetermined range (projection range) centered at the projection optical axis 56a in the projector 56. The distance image sensor 55 therefore obtains a three-dimensional structure (distance image data 62 (refer to FIG. 12)) on the projection plane 13 on which the image (target information image 77) is projected by the projector 56 as described later.

The projector 56 projects the image (target information image 77) in the predetermined range (projection range) centered at the projection optical axis 56a (refer to FIG. 3). In this case, as the projector 56 projects the image in the predetermined range centered at the projection optical axis 56a, the plane intersecting with the projection optical axis 56a is the projection plane 13 (refer to FIG. 6). In Embodiment 1, the projector 56 includes three light sources that emit RGB light on the same optical path. A two-dimensional deflection mirror is provided on the optical path. The projector 56 projects an arbitrary image on the projection plane 13 in the predetermined range centered at the projection optical axis 56a by appropriately driving each light source and the two-dimensional deflection mirror under the control of the terminal controller 52. The projector 56 is not limited to the configuration of Embodiment 1 as long as it projects an arbitrary image on the projection plane 13. The predetermined range (projection range) in which an image is projected, namely, the image to be projected has a rectangular shape (refer to FIG. 6). However, the shape of the predetermined range is not limited to that of Embodiment 1, and is appropriately set.

The communication part 57 establishes communication between the surveying instrument controller 37 (refer to FIG. 2) and the terminal controller 52 through the communication part 41 of the surveying instrument 20. The communication part 57 receives data sent from the surveying instrument controller 37 under the control of the terminal controller 52. In Embodiment 1, the communication part 57 establishes wireless communication. The terminal controller 52 wirelessly exchanges data with the surveying instrument controller 37 (communication part 41) through the communication part 57. The terminal controller 52 thereby receives data (for example, target coordinate data 71 and present coordinate data 75) sent from the surveying instrument controller 37 (communication part 41), and stores the data in the memory 53.

The display 58 appropriately displays data in the measurement and installation data indicating apparatus 50, the target coordinate data 71 received from the surveying instrument 20, and the target information image 77 generated by the terminal controller 52 under the control of the terminal controller 52.

The operation part 59 is an operation part for using various operations in the measurement and installation data indicating apparatus 50, and outputs the input data to the terminal controller 52. The operation part 59 switches the target position (measurement and installation point 72) in the target coordinate data 71 received from the surveying instrument 20, and ends the measurement and installation operation.

Next, the operation in the terminal controller 52 of the measurement and installation data indicating apparatus 50 in Embodiment 1 of the present invention will be described with reference to FIGS. 5 to 11. FIG. 11 shows the partially omitted target information image 77 projected on a front side part of stairs 741 in order to easily understand the projection of the partially omitted target information image 77 based on a projection maximum distance 85 in the terminal controller 52 (projector 56). However, the projection of the target information image 77 is not limited to the example illustrated in FIG. 11.

Figure 5:
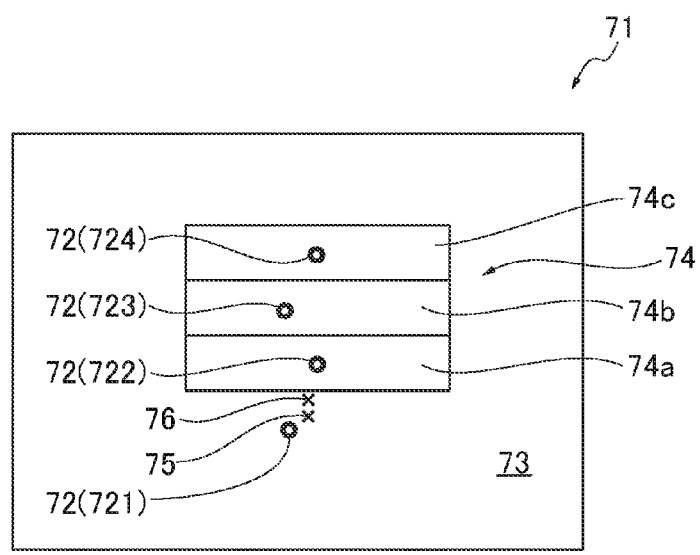
FIG. 5 is a view describing target coordinate data 71.

The terminal controller 52 receives the data sent from the surveying instrument controller 37 (communication part 41) through the communication part 57 as described above. The terminal controller 52 thereby receives the target coordinate data 71 as the coordinate data on the target position (measurement and installation point 72) from the surveying instrument controller 37 through the communication part 57. FIG. 5 shows one example of the target coordinate data 71. The target coordinate data 71 shown in FIG. 5 is a horizontal plane view for the measurement and installation operation. The target coordinate data 71 includes on the horizontal plane the measurement and installation points 72 as the target positions seen from the above in the vertical direction. The target coordinate data 71 is therefore used as the horizontal coordinate data (coordinate data on target position) as one example. The target coordinate data 71 shown in FIG. 5 includes the four measurement and installation points 72. The bottom measurement and installation point 72 (721) is located in a flat part 73, and the other three measurement and installation points 72 (722, 723, 724) are located in stairs 74 (refer to FIG. 8) provided on the flat part 73. In addition, when the target position is a structure, the target coordinate data 71 includes the position and shape of the structure although it is not shown in the figures.

The terminal controller 52 receives the measurement result of the target 12 (center position) obtained by the surveying instrument 20, namely, present coordinate data 75 as the coordinate data on the present position of the target 12 (center position) from the surveying instrument controller 37 through the communication part 57. In the measurement and installation data indicating apparatus 50, the target 12 and the communication part 57 therefore operate as one example of a positional data obtaining part that obtains the present coordinate data 75 as the coordinate data on the present position and the target coordinate data 71 as the coordinate data on the target position (measurement and installation point 72). The present coordinate data 75 shows an absolute position in the center position (center position of a plurality of corner cube prisms) of the target 12, as illustrated in FIG. 3. In the measurement and installation data indicating apparatus 50, the target 12 is fixed to the casing 51. The positional relationship (offset) among the central position of the target 12, the reference position of the distance image sensor 55, and the reference position of the projector 56 is therefore previously set. The positional relationship (offset) changes in accordance with the inclination of the casing 51. The terminal controller 52 therefore obtains correction coordinate data 76 as the coordinate data on the present position of the distance image sensor 55 and the projector 56 (reference position) based on the present coordinate data 75, the above positional relationship (offset), and the inclination data 61 (refer to FIG. 12) from the inclination sensor 54.

The terminal controller 52 obtains the direction of the detection optical axis 55a of the distance image sensor 55 and the projection optical axis 56a of the projector 56 while the casing 51 (reference direction 51a) is directed to the surveying instrument 20. The terminal controller 52 therefore obtains the absolute position of the measurement and installation data indicating apparatus 50 and also the absolute position (correction coordinate data 76) of the distance image sensor 55 and the projector 56 (reference position) based on the present coordinate data 75 by directing the casing 51 (reference direction 51a) to the surveying instrument 20. The terminal controller 52 thereby obtains the coordinate position (correction coordinate data 76) of the measurement and installation data indicating apparatus 50 and the position (distance and direction) of each target position (measurement and installation point 72) relative to the measurement and installation data indicating apparatus 50 by using the target coordinate data 71 (refer to FIGS. 5 and 6).

The terminal controller 52 generates the target information image 77 (refer to FIG. 6) based on the coordinate position (correction coordinate data 76) of the measurement and installation data indicating apparatus 50 and the position (distance and direction) of each target position (measurement and installation point 72) relative to the measurement and installation data indicating apparatus 50. The target information image 77 is an image for indicating data on each target position (measurement and installation point 72) in the range in which the projector 56 projects an image on the projection plane 13. The target information image 77 shows a target marking symbol 78 (refer to FIG. 8) as a mark showing the target position and a target indicating picture 79 (refer to FIG. 16).

Figure 7A:
FIG. 7A is a view illustrating a target marking symbol 78 in a target information image 77 projected by the measurement and installation data indicating apparatus 50 (projector 56).
Figure 7B:
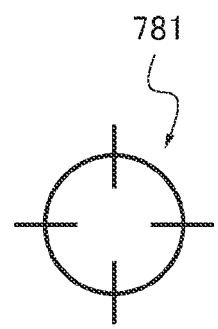
FIG. 7B is a view illustrating another target marking symbol 781 in the target information image 77 projected by the measurement and installation data indicating apparatus 50 (projector 56).
Figure 7C:
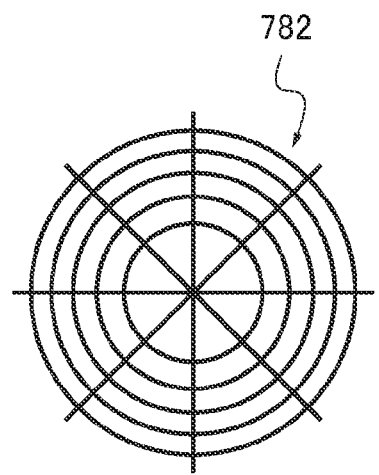
FIG. 7C is a view illustrating another target marking symbol 782, which is different from that in FIG. 7B, in the target information image 77 projected by the measurement and installation data indicating apparatus 50 (projector 56).

The target marking symbol 78 (refer to FIG. 8) shows the position of the measurement and installation point 72 (target position) in the target information image 77 when the target position is the measurement and installation point 72. The target marking symbol 78 is a double circle surrounding the measurement and installation point 72 as illustrated in FIG. 7A in Embodiment 1. The target marking symbol 78 is not limited to the sign in Embodiment 1. The target marking symbol 78 may be any shape as long as it specifies the position of the measurement and installation point 72. The target marking symbol 78 may be formed by combination of a circle and a straight line in the radiation direction as a target marking symbol 781 shown in FIG. 7B and a target marking symbol 782 shown in FIG. 7C or a straight line in the radiation direction as is not shown in the figures.

Figure 8:
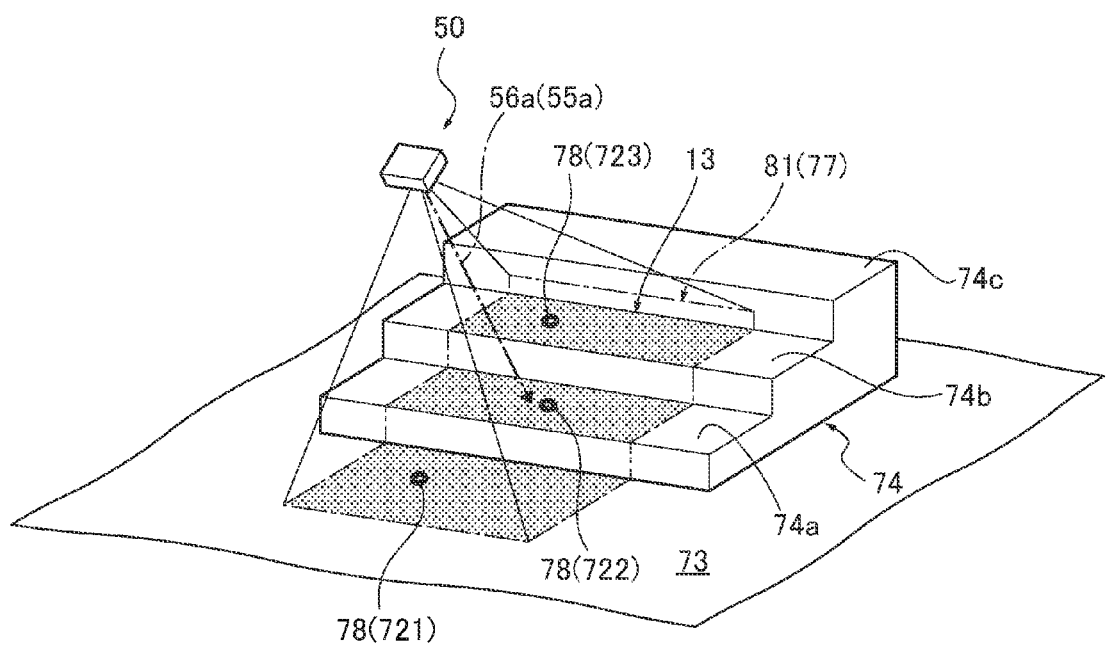
FIG. 8 is a view describing a measurement and installation image 81 (target information image 77) projected by the measurement and installation data indicating apparatus 50 (projector 56).

When the target information image 77 on which the target marking symbol 78 is displayed, namely, the target position is the measurement and installation point 72, the target information image 77 that is displayed for easily recognizing the position of the measurement and installation point 72 is used as a measurement and installation image 81 (refer to FIG. 8). The terminal controller 52 therefore generates the measurement and installation image 81 (refer to FIG. 8) as the target information image 77 when the target coordinate data 71 (refer to FIG. 5) for the measurement and installation operation is sent from the surveying instrument 20. In the measurement and installation data indicating apparatus 50, the measurement and installation image 81 (refer to FIG. 8) is generated by using the target coordinate data 71 (refer to FIG. 5) for use in the measurement and installation operation.

The target indicating picture 79 (refer to FIGS. 16 to 18) shows the position and the shape of the structure (target position) in the target information image 77 when the target position is the structure. The target indicating picture 79 therefore differs in its display form according to the type and the shape of the structure. The target indicating picture 79 shows a pipe provided under a floor in the example illustrated in FIG. 16, a pipe provided in a ceiling 13c in the example illustrated in FIG. 17, and a handrail attached to a wall 13w in the example illustrated in FIG. 18.

The target information image 77 displayed for easily recognizing the position and the shape of the structure is used as the structure image 82 (refer to FIGS. 16 to 18) when the target information image 77 on which the target indicating picture 79 is displayed, namely, the target position is the structure. The terminal controller 52 therefore generates the structure image 82 (refer to FIGS. 16 to 18) as the target information image 77 when the target coordinate data (not shown) on the position and the shape of the structure is sent from the surveying instrument 20 to the terminal controller 52. The terminal controller 52 also displays structure data 83 (refer to FIG. 16) on the structure image 82 in addition to the target indicating picture 79. The structure data 83 shows the data regarding the structure shown by the displayed target indicating picture 79. The structure data 83 shows the last maintenance day of the pipe as the structure shown by the target indicating picture 79 in the example illustrated in FIG. 16. As the target coordinate data (not shown) on the shape and the position of the structure has the data on the structure, the terminal controller 52 obtains the data for generating the structure data 83, and generates the structure data 83 to be displayed on the structure image 82. In the measurement and installation data indicating apparatus 50, the structure image 82 (refer to FIGS. 16 to 18) is generated by using the target coordinate data (not shown) on the position and the shape of the structure to be used for obtaining the position, the shape, and the related data on the structure.

As illustrated in FIG. 6, the terminal controller 52 obtains the inclination data 61 (refer to FIG. 12) by detecting the inclination of the casing 51 (reference direction 51a), namely, the projection optical axis 56a of the projector 56 and the detection optical axis 55a of the distance image sensor 55 relative to the horizontal plane with the inclination sensor 54 configured by a three-axis acceleration sensor. The inclination sensor 54 therefore operates as an inclination data obtaining part that obtains the inclination data 61 on the detection optical axis 55a and the projection optical axis 56a relative to the vertical direction. The terminal controller 52 therefore obtains the absolute direction of the detection optical axis 55a of the distance image sensor 55 and the projection optical axis 56a of the projector 56 based on the present coordinate data 75 and the inclination data 61 from the inclination sensor 54 by directing the reference direction 51a of the casing 51 to the surveying instrument 20 as described above. In other words, when the surveying instrument 20 measures the absolute position on the coordinate by X, Y, Z axes, the terminal controller 52 obtains the position and the direction, on the X, Y, Z coordinate, of the original point o and the u, v, w axes set by the inclination sensor 54 in the measurement and installation data indicating apparatus 50.

The terminal controller 52 thereby generates the target information image 77 (image data) to be projected (formed) as an appropriate image on the projection plane 13 of the horizontal plane on the projection optical axis 56a. The appropriate image on the projection plane 13 is the target information image 77 having no significant distortion, which is projected on the projection plane 13 of the horizontal plane. As the incident angle of the projection optical axis 56a relative to the projection plane 13 changes according to the inclination of the measurement and installation data indicating apparatus 50, the projected target information image 77 may have significant distortion if the target information image 77 is not adjusted according to the inclination.

The terminal controller 52 corrects the generated target information image 77 (measurement and installation image 81 and structure image 82) to fit to the shape of the projection plane 13 based on the distance image data 62 (three-dimensional structure (refer to FIG. 12)) showing a three-dimensional structure on the projection plane 13 obtained by the distance image sensor 55. In this case, by changing the target information image 77 in accordance with the irregularity (including inclination of projection plane 13) on the projection plane 13, the target information image 77 is seen as being formed on a plane when the target information image 77 is seen from a predetermined direction. In Embodiment 1, the target information image 77 fits to the shape of the projection plane 13 by changing the target information image 77 to associate with the target coordinate data 71 when the projected target information image 77 is seen in the direction (vertical direction in example of target coordinate data 71) orthogonal to the projection plane 13.

Figure 9:
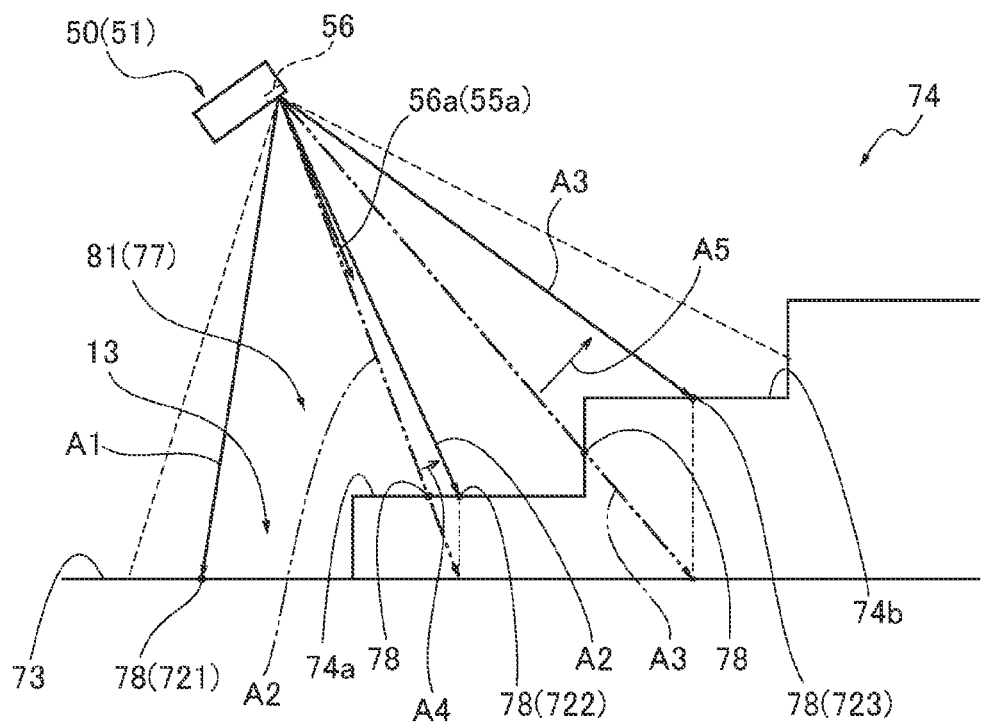
FIG. 9 is a view describing the measurement and installation image 81 (target information image 77) generated by the measurement and installation data indicating apparatus 50 (terminal controller 52).

This will be described with the target coordinate data 71 shown in FIG. 5. As described above, in the target coordinate data 71, the measurement and installation point 721 is positioned in the flat part 73, and the measurement and installation points 722, 723, 724 are poisoned in the stairs 74 (refer to FIG. 8) projecting upward from the flat part 73. In this case, the reference plane for the measurement in the surveying instrument 20 is the flat part 73. As illustrated in FIG. 9, for example, the terminal controller 52 generates the target information image 77 (measurement and installation image 81 (image data)) formed as an appropriate image on the flat part 73 with the flat part 73 (reference plane) of the projection plane 13 as the horizontal plane. When the distance image data 62 (three-dimensional structure (refer to FIG. 12)) is not obtained from the distance image sensor 55, the condition (irregularity and inclination) of the flat part 73 (reference surface) is not obtained. For this reason, the terminal controller 52 displays the target marking symbol 78 in each position of the flat part 73 in the target information image 77 (measurement and installation image 81 (image data)) to be generated, such that each measurement and installation point 72 is positioned on the flat part 73. As the flat part 73 has a height equal to that of the reference plane, the target marking symbol 78 is displayed in an appropriate position relative to the measurement and installation point 721 located in the flat part 73 (refer to allow A1). However, a first step 74a of the stairs 74 has a height higher than that of the flat part 73 (reference plane), the target marking symbol 78 cannot be displayed at an appropriate position relative to the measurement and installation point 722 located at the first step 74a (refer to arrow A2 shown by two-dot chain line and reference number 78 on arrow A2). Similarly, as a second step 74b has a height further higher than that of the flat part 73 (reference plane), the target marking symbol 78 cannot be displayed at an appropriate position relative to the measurement and installation point 723 located at the second step 74b (refer to arrow A3 shown by two-dot chain line and reference number 78 on arrow A3). In the examples shown in FIGS. 8 and 9, the measurement and installation point 724 located at a third step 74c does not present in a range in which the projector 56 projects an image on the projection plane 13, the target marking symbol 78 is not displayed relative to the measurement and installation point 724.

The terminal controller 52 therefore corrects the position (refer to arrow A4) in which the target marking symbol 78 is projected by a difference in the height of the first step 74a of the stairs 74 in which the measurement and installation point 722 is located relative to the flat part 73 (reference plane), based on the distance image data 62 (three-dimensional structure) on the projection plane 13 obtained by the distance image sensor 55. In this case, the target information image 77 fits to the shape of the projection plane 13 (refer to arrow A4) by changing the projection position of the target marking symbol 78 such that the target marking symbol 78 associates with the target coordinate data 71 when the projection plane 13 on which the target marking symbol 78 (target information image 77) is projected is seen from the above in the vertical direction, as the target coordinate data 71 has a horizontal plan view. The target marking symbol 78 is thereby displayed at an appropriate position relative to the measurement and installation point 722 located at the first step 74a (refer to arrow A2). Similarly, the terminal controller 52 also corrects the projection position of the target marking symbol 78 by a difference in the height of the second step 74b of the stairs 74 in which the measurement and installation point 723 is located relative to the flat part 73 (reference plane), based on the distance image data 62 (three-dimensional structure) on the projection plane 13 obtained by the distance image sensor 55 (refer to arrow A5). The target marking symbol 78 is thereby displayed at an appropriate position relative to the measurement and installation point 723 located at the second step 74b (refer to arrow A3).

Similar to the correction of the projection position of the target marking symbol 78, the terminal controller 52 appropriately corrects the positions of all pixels in the target information image 77 (measurement and installation image 81) to be projected based on the distance image data 62 (three-dimensional structure) on the projection plane 13 obtained by the distance image sensor 55. In this case, when the number of distance measurement points of the distance image data 62 (three-dimensional structure) obtained by the distance image sensor 55 is less than the number of all pixels in the target information image 77 (measurement and installation image 81), the terminal controller 52 appropriately corrects the position to be projected relative to all pixels by executing a complementary process with the distance image data 62 (three-dimensional structure) of a plurality of surrounding distance measurement points or adjacent distance measurement points. The terminal controller 52 thereby corrects the generated target information image 77 to fit to the shape of the projection plane 13. The terminal controller 52 controls the driving of the projector 56 to project the corrected target information image 77 (image data). As illustrated in FIG. 8, the measurement and installation data indicating apparatus 50 (projector 56) projects the target information image 77 on the flat part 73 and the stairs 74 to fit to the shapes of the flat part 73 and the stairs 74. In the example illustrated in FIG. 8, as the target information image 77 is projected from the flat part 73 to the stairs 74, a vertically rising part (riser) provided between the respective steps cannot be seen from the above in the vertical direction. Thus, no light is projected to the vertically rising part (riser), and no image is projected to the vertically rising part (part surrounded by two-dot chain line without diagonal line). As described above, the terminal controller 52 executes the measurement and installation data indicating method of the present invention of correcting the target information image 77 (measurement and installation image 81) to be projected to conform to the shape of the projection plane 13 based on the distance image data 62 (three-dimensional structure) on the projection plane 13 obtained by the distance image sensor 55, and controlling the driving of the projector 56 to project the corrected target information image 77 (image data).

In the above description, the target information image 77 (measurement and installation image 81 (image data)) is generated with the flat part 73 (reference plane) of the projection plane 13 as the horizontal plane, and corrects the generated target information image 77 based on the distance image data 62 (three-dimensional structure) in the projection plane 13 obtained by the distance image sensor 55. However, this is not limited to the configuration of Embodiment 1. The target information image 77 (measurement and installation image 81 (image data)) before correction may be generated with a plane including a point at which the projection optical axis 56a intersects with the flat part 73 and orthogonal to the projection optical axis 56a as the reference plane, or may be generated with another plane relevant to the flat part 73 as the reference plane. Even in this case, the target information image 77 (measurement and installation image 81) to be projected is corrected to fit to the shape of the projection plane 13 with the similar method as described above by correcting the target information image 77 (measurement and installation image 81 (image data)) by a difference in the position in the direction orthogonal to the plane shown by the coordinate data on the reference plane and the projection plane 13 (height in vertical direction in example of target coordinate data 71).

Figure 10:
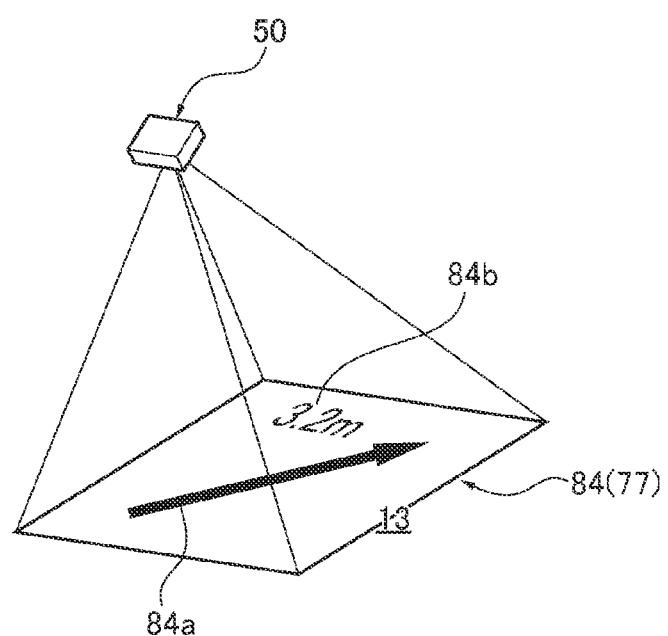
FIG. 10 is a view describing a guide image 84 (target information image 77) projected by the measurement and installation data indicating apparatus 50 (projector 56).
Figure 11:
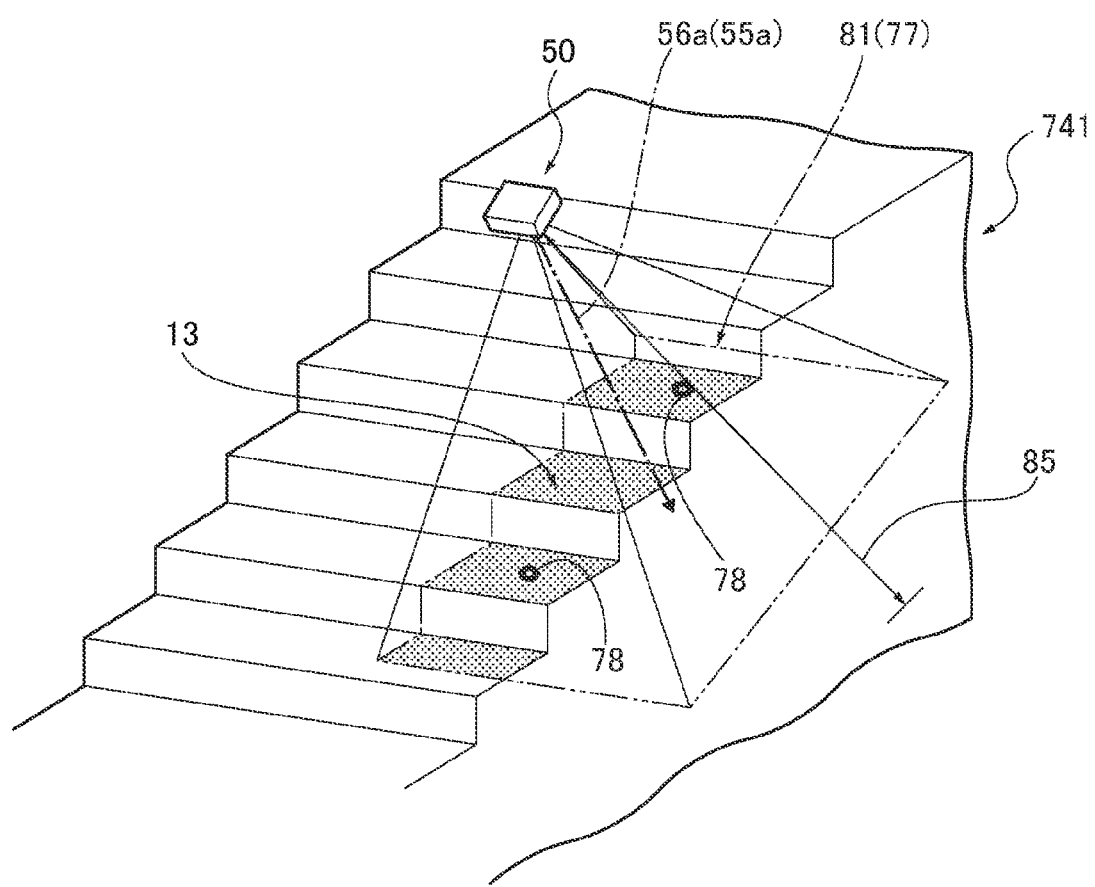
FIG. 11 is a view describing a partially omitted measurement and installation image 81 (target information image 77) projected by the measurement and installation data indicating apparatus 50 (projector 56).

When the target position (for example, measurement and installation point 72) does not present in the range in which the projector 56 projects an image on the projection plane 13, the terminal controller 52 generates as the target information image 77 a guide image 84 that guides to the target position, as illustrated in FIG. 10. In the example illustrated in FIG. 10, the guide image 84 includes an arrow mark 84a showing a direction toward a target position from the coordinate position (corrected coordinate data 76) of the measurement and installation data indicating apparatus 50 and a distance display 84b showing a distance from the coordinate position (corrected coordinate data 76) to the target position. The terminal controller 52 appropriately corrects the guide image 84 as the target information image 77 to fit to the shape of the projection plane 13 based on the distance image data 62 on the three-dimensional structure on the projection plane 13 obtained by the distance image sensor 55 as described above. The terminal controller 52 controls the driving of the projector 56 to project the appropriately corrected guide image 84 (image data). When the target position does not present in the range in which the projector 56 projects the image on the projection plane 13, the measurement and installation data indicating apparatus 50 (projector 56) appropriately projects the guide image 84 as the target information image 77 on the projection plane 13. In addition, the guide image 84 is not limited to that (example illustrated in FIG. 10) in Embodiment 1 as long as it guides to the target position. The corrected coordinate data 76 is used as the coordinate position of the measurement and installation data indicating apparatus 50 for the guide image 84. However, it is not limited to that in Embodiment 1. The present coordinate data 75 may be used.

The terminal controller 52 sets a projection maximum distance 85 that defines the maximum value of the projection distance when the projector 56 projects the image on the projection plane 13 as illustrated in FIG. 11. Such a maximum distance 85 is set based on the facts that as the projector 56 projects an image, it is necessary to emit a large amount of light while the visibility of the projected image is deteriorated in accordance with an increase in a distance, and it is not practical if the image is projected on a plane significantly away from the projector 56, namely, the measurement and installation data indicating apparatus 50. In Embodiment 1, the projection maximum distance 85 is previously set, and is changed by the operation to the operation part 59. The terminal controller 52 corrects a part of the generated target information image 77 (measurement and installation image 81, structure image 82, and guide image 84) exceeding the projection maximum distance 85 within the range in which the projector 56 projects the image, so as to partially omit the target information image 77, based on the distance image data 62 showing the three-dimensional structure on the projection plane 13 obtained by the distance image sensor 55. The terminal controller 52 controls the driving of the projector 56 to project the corrected target information image 77 (image data) as described above. The target information image 77 is thus projected while no light is projected on the part exceeding the projection maximum distance 85, and light is only projected on the remaining part which does not exceed the projection maximum distance 85. In the example illustrated in FIG. 11, the measurement and installation image 81 is projected over the stairs 741 and the omitted part in the front side end of the stairs 741 similar to FIG. 8. A part of the measurement and installation image 81 is omitted in the omitted part (part surrounded by two-dot chain line without diagonal line). The target information image 77 (measurement and installation image 81) is thus projected while the light is only projected on the stairs 741. No light is projected in the front part even in the range in which the projector 56 projects an image on the projection plane 13.

Figure 12:
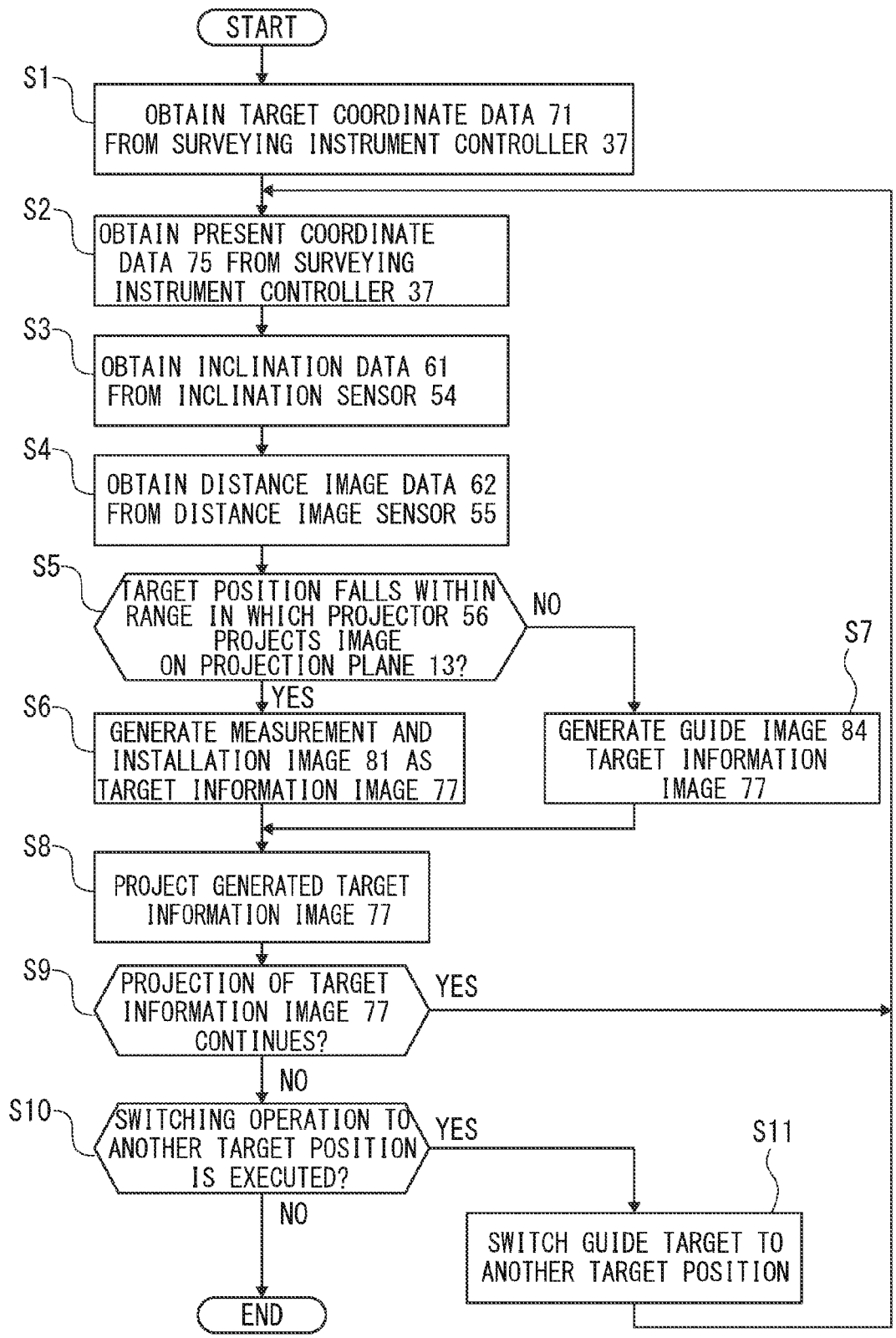
FIG. 12 is a flowchart showing a measurement and installation data indicating process which is executed by a terminal controller 52 of the measurement and installation data indicating apparatus 50 in Embodiment 1.

Next, the measurement and installation data indicating process for the measurement and installation operation, which is executed by the terminal controller 52 (refer to FIG. 4) of the measurement and installation data indicating apparatus 50 according to Embodiment 1 of the present invention, will be described with reference to FIG. 12. FIG. 12 is a flowchart showing the measurement and installation data indicating process (measurement and installation data indicating method) which is executed by the terminal controller 52 in Embodiment 1. This measurement and installation data indicating process (measurement and data indicating method) is executed by the terminal controller 52 based on a program stored in the memory 53. Hereinafter, each step of the flowchart of FIG. 12 as the measurement and installation data indicating process (measurement and installation data indicating method) will be described. The flowchart of FIG. 12 starts in response to the request for the measurement and installation operation to the operation part 59.

In Step S1, the target coordinate data 71 (coordinate data on target position) is obtained from the surveying instrument controller 37 of the surveying instrument 20, and the program proceeds to Step S2. In Step S1, the target coordinate data 71 is obtained by receiving through the communication part 57 the target coordinate data 71 sent by the surveying instrument controller 37 through the communication part 41.

Following Step S1 of obtaining the target coordinate data 71 from the surveying instrument controller 37, Step S9 of determining the continuation of the projection of the target information image 77 (measurement and installation image 81 or guide image 84), or Step S11 of switching the target to be guided to another target position (measurement and installation point 72), in Step S2, the present coordinate data 75 (coordinate data on present position) is obtained from the surveying instrument controller 37 of the surveying instrument 20. In Step S2, the measurement result of the target 12 (center position) sent by the surveying instrument controller 37 through the communication part 41, namely, the present coordinate data 75 (refer to FIG. 6), which is the coordinate data of the present position of the target 12 (center position), is obtained by receiving through the communication part 57.

Following Step S2 of obtaining the present coordinate data 75 from the surveying instrument controller 37 of the surveying instrument 20, in Step S3, inclination data 61 is obtained from the inclination sensor 54. In Step S3, the inclination data 61 showing the inclination relative to the horizontal plane of the projection optical axis 56a of the projector 56 and the detection optical axis 55a of the casing 51, namely, of the distance image sensor 55 detected by the inclination sensor 54 is obtained.

Following Step S3 of obtaining the inclination data 61 from the inclination sensor 54, in Step S4, the distance image data 62 is obtained from the distance image sensor 55. In Step S4, the distance image data 62 showing the three-dimensional structure in a predetermined range with the detection optical axis 55a detected by the distance image sensor 55 as the center is obtained. In addition, the order of Steps S2 to S4 is not limited to this order in Embodiment 1.

Following Step S4 of obtaining the distance image data 62 from the distance image sensor 55, in Step S5, it is determined whether or not the present position presents in the range in which the projector 56 projects the image on the projection plane 13. The process proceeds to Step S6 in the case of Yes while the process proceeds to Step S7 in the case of No. In Step S5, it is determined whether or not the mark (target marking symbol 78) showing the target position in the target information image 77 is displayed by determining of whether or not the target position presents in the range in which the projector 56 projects the image on the projection plane 13.

Following Step S5 of determining that the target position presents in the range in which the projector 56 projects the image on the projection plane 13, in Step S6, the measurement and installation image 81 as the target information image 77 is generated. As the target position presents in the range where the projector 56 projects the image on the projection plane 13, the mark (target marking symbol 78) showing the target position is displayed. The measurement and installation image 81 as the target information image 77 including the mark (target marking symbol 78) is therefore generated. In Step S6, the measurement and installation image 81 is thereby generated as the target information image 77 including the mark (target marking symbol 78). In Step S6, as described above, the measurement and installation image 81 is generated based on the coordinate position (corrected coordinate data 76) of the measurement and installation data indicating apparatus 50 and the position (distance and direction) of each target position (measurement and installation point 72) relative to the measurement and installation data indicating apparatus 50, and the measurement and installation image 81 is appropriately corrected based on the inclination data 61 from the inclination sensor 54 and the distance image data 62 (three-dimensional structure) from the distance image sensor 55. The measurement and installation image 81 which fits to the shape of the projection plane 13 in the range in which the projector 56 projects an image is thereby generated.

Following Step S5 of determining that the target position does not present in the range in which the projector 56 projects the image on the projection plane 13, in Step S7, the guide image 84 as the target information image 77 is generated. In Step S7, as the target position does not present in the range in which the projector 56 projects the image on the projection plane 13, the mark (target marking symbol 78) showing the target position is not displayed. For this reason, the guide image 84 that guides to the target position as the target information image 77 is generated in Step S7. In Step S7, as described above, the guide image 84 is generated based on the coordinate position of the measurement and installation data indicating apparatus 50 (corrected coordinate data 76) and the position of each target position (measurement and installation point 72) relative to the measurement and installation data indicating apparatus 50, and the guide image 84 is appropriately corrected based on the distance image data 62 (three-dimensional structure) from the distance image sensor 55 and the inclination data 61 from the inclination sensor 54. The guide image 84 which fits to the shape of the projection plane 13 in the range in which the projector 56 projects an image is thereby generated.

Following Step S6 of generating the measurement and installation image 81 as the target information image 77 or Step S7 of generating the guide image 84 as the target information image 77, in Step S8, the generated target information image 77 (measurement and installation image 81 or guide image 84) is projected. In Step S8, the driving of the projector 56 is controlled to project the generated target information image 77 (measurement and installation image 81 or guide image 84). In Step S8, when the target position presents in the range in which the projector 56 projects an image on the projection plane 13, the measurement and installation image 81 (target information image 77) including the mark (target marking symbol 78) showing the present position is projected from the projector 56. In Step S8, when the target position does not present in the range in which the projector 56 projects an image on the projection plane 13, the guide image 84 (target information image 77) which guides to the target position is projected from the projector 56 (refer to FIG. 10).

Following Step S8 of projecting the target information image 77 (measurement and installation image 81 or guide image 84), in Step S9, it is determined whether or not the projection of the target information image 77 (measurement and installation image 81 or guide image 84) is continued. The process returns to Step S2 in the case of Yes while, the process proceeds to Step S10 in the case of No. In Step S9, it is determined whether or not the present projection of the target information image 77 (measurement and installation image 81 or guide image 84) is continued, namely, whether or not the projection of the target information image 77 for the measurement and installation operation is continued. Such projection is not continued when it is not necessary to measure the position of another measurement and installation point 72 (target position) after the measurement and installation point 72 as the guided target position has been reached for the piling, or when the measurement and installation operation is completed, for example. In Step S9, it is determined that the projection is not continued when the operation which does not continue the projection is performed to the operation part 59, and it is determined that the projection is continued when such an operation is not performed.

Following Step S9 of determining that the projection of the target information image 77 (measurement and installation image 81 or guide image 84) is not continued, in Step S10, it is determined whether or not the switching operation to another target position (measurement and installation point 72) is performed. The process proceeds to Step S11 in the case of Yes while the measurement and installation data indicating process (measurement and installation data indicating method) ends in the case of No. In Step S10, when the switching operation to another target position (measurement and installation point 72) is performed to the operation part

59, the process proceeds to Step S11 for starting the guide to another target position (measurement and installation point 72). In Step S10, when the switching operation to another target position (measurement and installation point 72) is not performed to the operation part 59, the operation which does not continue the projection of the target information image 77 (measurement and installation image 81 or guide image 84) is executed in Step 9. In this case, it is determined that it is not necessary to guide to the target position (measurement and installation point 72) for the measurement and installation operation, and the measurement and installation data indicating process (measurement and installation data indicating method) ends.

Following Step S10 of determining that the switching operation to another target position (measurement and installation point 72) is performed, in Step S11, the target to be guided is switched to another target position (measurement and installation point 72). Then, the process returns to Step S2.

Figure 13:
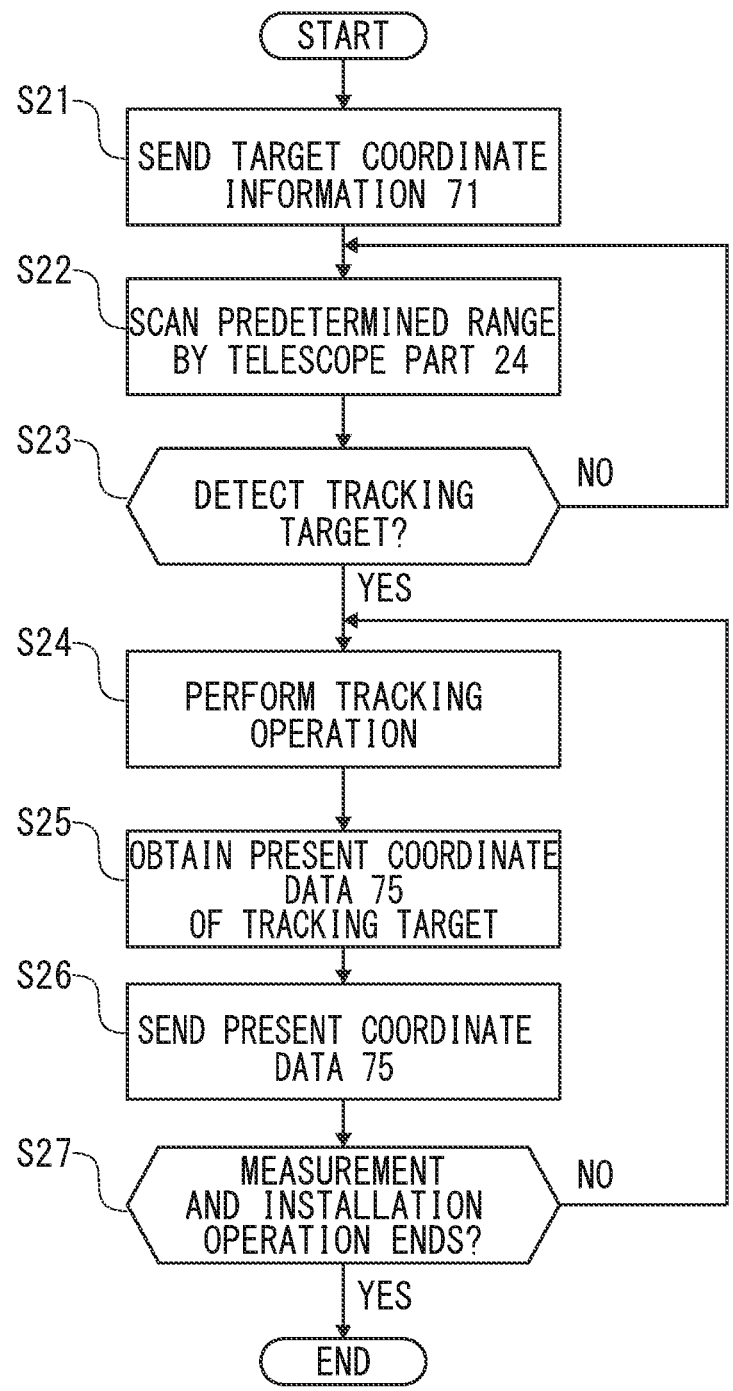
FIG. 13 is a flowchart showing a measurement and installation operation process which is executed by a surveying instrument controller 37 of the surveying instrument 20 in Embodiment 1.

Next, the measurement and installation operation process for the measurement and installation operation which is executed by the surveying instrument controller 37 (refer to FIG. 2) of the surveying instrument 20 will be described with reference to FIG. 13. FIG. 13 is a flowchart showing the measurement and installation operation process (measurement and installation operation process method) which is executed by the surveying instrument controller 37 in Embodiment 1. This measurement and installation operation process (measurement and installation operation process method) is executed by the surveying instrument controller 37 based on a program stored in the memory 38. Hereinafter, each step of the flowchart of FIG. 13 as the measurement and installation operation process (measurement and installation operation process method) will be described. The flowchart of FIG. 13 starts in response to the request for the measurement and installation operation to the operation part 27.

In Step S21, the target coordinate data 71 (coordinate data on target position) is sent through the communication part 41.

Following Step S21 of sending the target coordinate data 71 or Step S23 of determining that the tracking target (target 12) is not detected, in Step S22, a predetermined range is scanned by the telescope part 24. In Step S22, the scanning in the predetermined range is started by the telescope part 24 by controlling the driving of the horizontal rotation driver 33 and the vertical rotation driver 35 to appropriately rotate the frame 12 and the telescope 24 while projecting the tracking light by controlling the tracking part 32. When the scanning has already been started, the scanning (operation for scanning) is continued.

Following Step S22 of starting the scanning in the predetermined range by the telescope part 24, in Step S23, it is determined whether or not the tracking target (target 12) is detected. The process proceeds to Step S24 in the case of Yes while the process proceeds to Step S22 in the case of No. In Step S23, when the reflection light of the tracking light from the tracking target (target 12) is received by the tracking part 32, it is determined that the tracking target (target 12) is detected, and the process proceeds to Step S24 for starting the tracking. In Step S23, when the reflection light is not received by the tracking part 32, it is determined that the tracking target (target 12) is not detected, and the process returns to Step S22 to continue the scanning, namely, detect the tracking target (target 12).

Following Step S23 of determining that the tracking target (target 12) is detected or Step S27 of determining that the measurement and installation operation continues, in Step S24, the tracking operation is performed. In Step S24, the tracking operation which always directs the telescope part 24 (refer to FIG. 1) in the direction of the tracking target (target 12) is started by controlling the driving of the horizontal rotation driver 33 and the vertical rotation driver 35 based on the data on the position of the tracking target (target 12) from the tracking part 32. When the tracking operation is already started, the tracking operation is continued.

Following Step S24 of starting the tracking operation, in Step S25, the present coordinate data 75 on the tracing target (target 12) is obtained. In Step S25, the coordinate data on the target 12 (center position (center position of a plurality of corner cube prisms)) is measured, and the present coordinate data 75 as the coordinate data (three-dimensional position) on the present position of the target 12 is obtained.

Following Step S25 of obtaining the present coordinate data 75 of the tracking target (target 12), in Step S26, the present coordinate data 75 is sent. In Step S26, the present coordinate data 75 on the tracking target (target 12) is sent through the communication part 41.

Following Step S26 of sending the present coordinate data 75, in Step S27, it is determined whether or not the measurement and installation operation ends. The measurement and installation operation process (measurement and installation operation process method) is completed in the case of YES, while the process returns to Step S24 in the case of NO. In Step S27, when the operation which ends the measurement and installation operation is performed to the operation part 27, it is determined that the measurement and installation operation ends, and the measurement and installation operation process (measurement and installation operation process method) ends. In Step S27, when the above operation is not performed to the operation part 27, it is determined that the measurement and installation operation does not end, and the process returns to Step S24 to repeat the above tracking operation (Step S24), the obtaining of the present coordinate data 75 (Step S25), and the sending of the present coordinate data 75 (Step S26).

Figure 14:
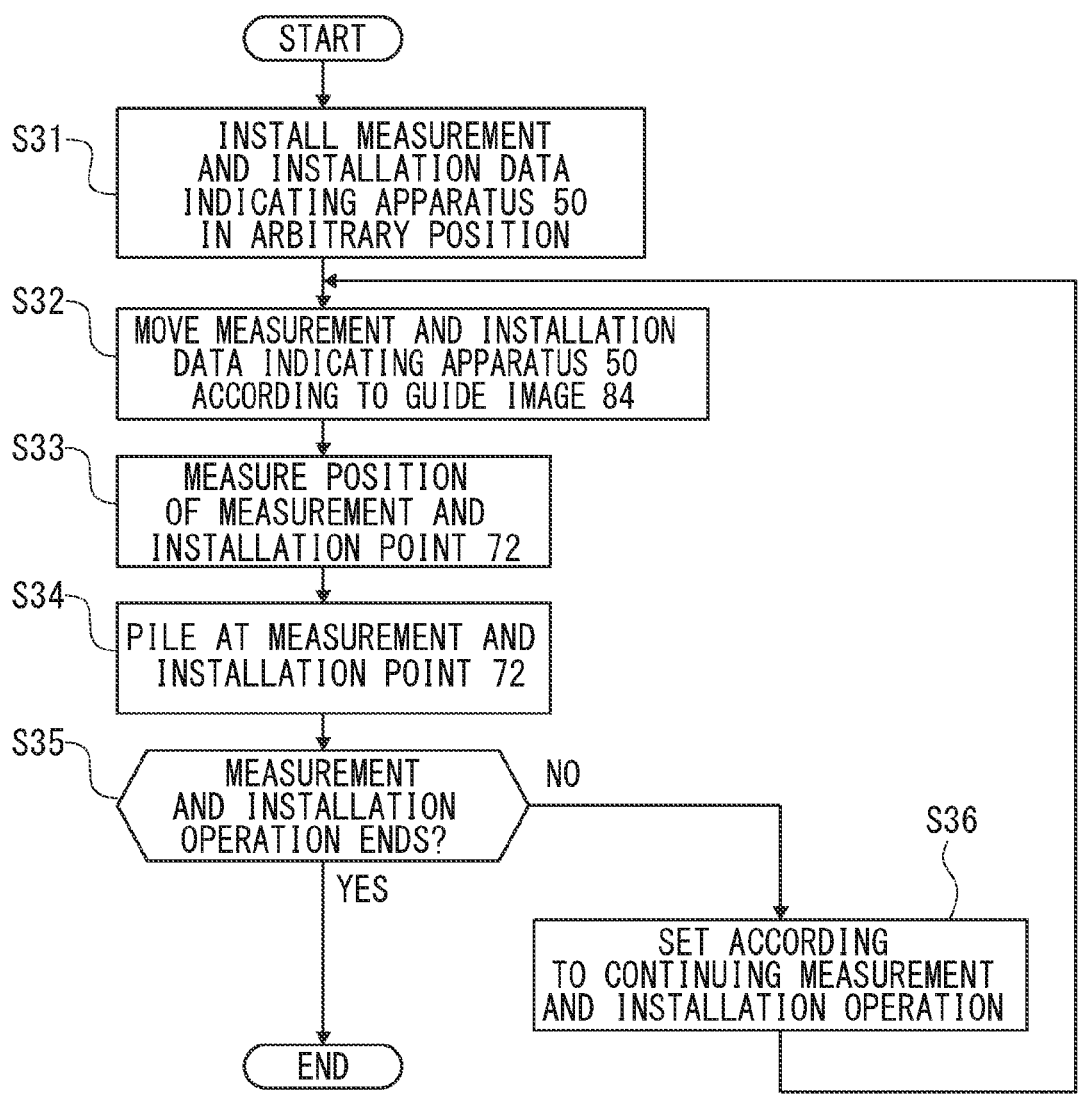
FIG. 14 is a flowchart showing a measurement and installation operation which is executed by the surveying system 10 in Embodiment 1.

Next, the measurement and installation operation which is performed by an operator with the surveying system 10, namely, the measurement and installation data indicating apparatus 50 and the surveying instrument 20 will be described with reference to FIG. 14. FIG. 14 is a flowchart showing the contents of the measurement and installation operation which is performed by the surveying system 10. The flowchart of FIG. 14 shows an example using the target coordinate data 71 as the coordinate data on the target position, and shows the measurement and installation operation which drives the pile 86 (refer to FIG. 15) at each measurement and installation point 72 written in the target coordinate data 71, namely, piling, with the surveying system 10 (measurement and installation data indicating apparatus 50 and surveying instrument 20). The flowchart of FIG. 14 starts in response to the request for the measurement and installation operation to the operation part 27 of the surveying instrument 20 and the operation part 59 of the measurement and installation data indicating apparatus 50.

In Step S31, the measurement and installation data indicating apparatus 50 is disposed in an arbitrary position. In Step S31, an operator holds the pole 11 for surveying in the arbitrary position, and installs the measurement and installation data indicating apparatus 50 attached to the upper end of the pole 11 to direct the casing 51 (reference direction 51*a*) toward the surveying instrument 20 (refer to FIG. 1). Then, the surveying instrument 20 sends the target coordinate data 71 in Step S21 of the flowchart of FIG. 13, while the measurement and installation data indicating apparatus 50 obtains the target coordinate data 71 in Step S1 of the flowchart of FIG. 12. The surveying instrument 20 detects the target 12 of the measurement and installation data indicating apparatus 50 (refer to FIG. 6) by repeating Step S22, Step S23, and Step S22 of the flowchart of FIG. 13. After that, the surveying instrument 20 starts the tracking of the target 12 in Step S24 of the flowchart of FIG. 13, obtains the present coordinate data 75 on the target 12 in Step S25, and repeats the sending of the present coordinate data 75 in Step S26. Then, the measurement and installation data indicating apparatus 50 obtains the present coordinate data 75 in Step S2 of the flowchart of FIG. 12, and proceeds to Step S3, Step S4, Step S5, Step S7, Step S8, and Step S9, so that the guide image 84 for guiding to the measurement and installation point 72 is projected from the projector 56 (refer to FIG. 10). After that, the process proceeds to Step S32.

Following Step S31 of installing the measurement and installation data indicating apparatus 50 in an arbitrary position, in Step S32, the measurement and installation data indicating apparatus 50 is moved according to the guide image 84. In Step S32, the measurement and installation data indicating apparatus 50 held through the pole 11 is moved according to the guide image 84. In this case, the surveying instrument 20 repeats the tracking of the target 12 and the obtaining and the sending of the present coordinate data 75 through the repetition of Step S24, Step S25, Step S26, Step S27, and Step S24 in the flowchart of FIG. 13. The measurement and installation data indicating apparatus 50 updates the guide image 84 (refer to FIG. 10) for guiding to the measurement and installation point 72 according to a change in the position of the measurement and installation data indicating apparatus 50 (target 12) while projecting the guide image from the projector 56 through the repetition of Step S3, Step S4, Step S5, Step S7, Step S8, Step S9, Step S2, and Step S3 of the flowchart of FIG. 12. When the measurement and installation data indicating apparatus 50 moves to the position where the measurement and installation point 72 presents in the range in which the projector 56 projects an image on the projection plane 13, the process proceeds to Step S33.

Following Step S32 of moving the measurement and installation data indicating apparatus 50, in Step S33, the position of the measurement and installation point 72 is measured. In Step S33, the measurement and installation data indicating apparatus 50 is moved to the position of the measurement and installation point 72 in the range in which the projector 56 projects an image on the projection plane 13 in Step S32. The measurement and installation data indicating apparatus 50 therefore updates the measurement and installation image 81 (refer to FIG. 8) including each target marking symbol 78 showing each measurement and installation point 72 according to a change in the position of the measurement and installation data indicating apparatus 50 (target 12) and projects the measurement and installation image 81 from the projector 56 through the repetition of Step S3, Step S4, Step S5, Step S6, Step S8, Step S9, Step S2, and Step S3 in the flowchart of FIG. 12. In this case, the surveying instrument 20 repeats the tracking of the target 12 and the obtaining and the sending of the present coordinate data 75 through the repetition of Step S24, Step S25, Step S26, Step S27, and Step S24 in the flowchart of FIG. 13. The operator therefore measures the position of the target measurement and installation point 72.

Following Step S33 of measuring the position of the measurement and installation point 72, in Step S34, the piling is performed at the measurement and installation point 72. In Step S34, the measurement and installation point 72 is piled by driving the pile 86 (refer to FIG. 15) at a point in which the target marking symbol 78 of the measurement and installation image 81 (refer to FIG. 8) is projected.

Following Step S34 of the piling at the measurement and installation point 72, in Step S35, it is determined whether or not the measurement and installation operation is completed. The measurement and installation operation ends in the case of Yes while the process proceeds to Step S36 in the case of No. In Step S35, the measurement and installation operation ends by performing the operation which ends the measurement and installation operation to the operation part 59 of the measurement and installation data indicating apparatus 50 and the operation part 27 of the surveying instrument 20. When the piling is performed at another measurement and installation point 72 or when it is confirmed whether or not the piling point is correct, the process proceeds to Sep S36 to repeat the above each step without ending the measurement and installation operation.

Following the determination of Step S35, in Step S36, the measurement and installation operation is set according to the measurement and installation operation to be continued. In Step S36, when the switching operation to another measurement and installation point 72 is performed, the above steps are repeated to another measurement and installation point 72 as the target. When the measurement and installation operation simply continues, the measurement and installation operation is set according to the measurement and installation operation by repeating the above steps.

As described above, when the measurement and installation data indicating apparatus 50 (surveying system 10) is used for the measurement and installation operation which performs the piling at each measurement and installation point 72 written in the target coordinate data 71 (coordinate data on target position), the measurement and installation data indicating apparatus 50 projects the target information image 77 on the projection plane 13 based on the measurement result by the surveying instrument 20 and the target coordinate data 71. The target information image 77 is used as the guide image 84 when the measurement and installation point 72 as the target position is located at a far point. An operator therefore moves to the measurement and installation point 72 (target position) according to the guide image 84. The target information image 77 is used as the measurement and installation image 81 including the target marking symbol 78 showing the measurement and installation point 72 as approaching the measurement and installation point 72 as the target position. The operator therefore measures each measurement and installation point 72 written in the target coordinate data 71 with the position of the projected target marking symbol 78. Thus, the operator using the measurement and installation data indicating apparatus 50 (surveying system 10) appropriately performs the piling at each measurement and installation point 72.

Figure 15:
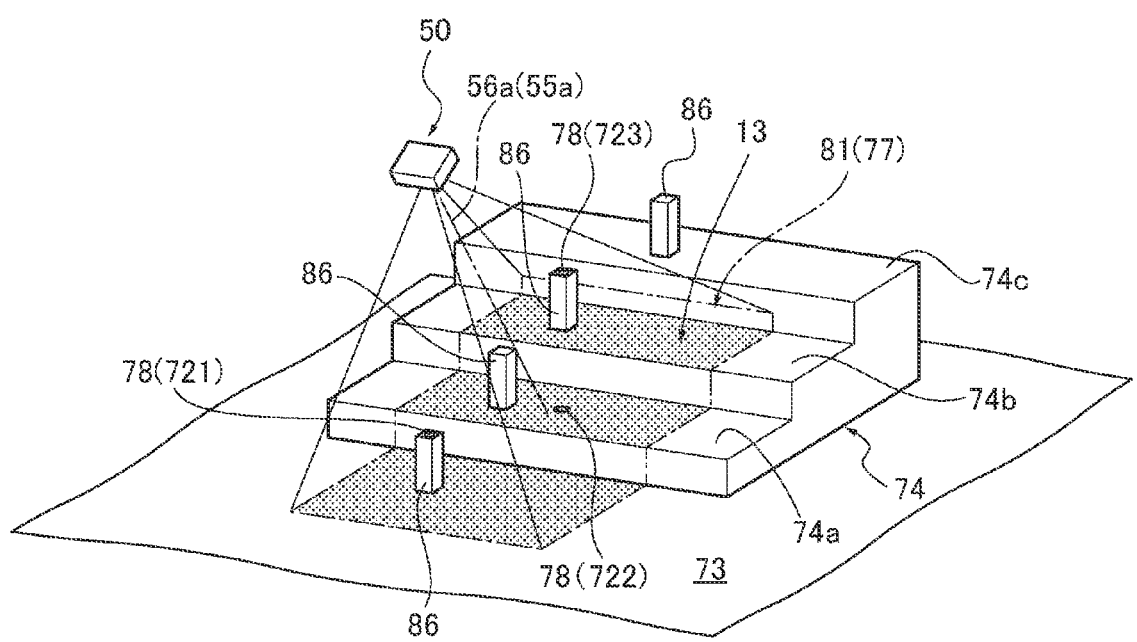
FIG. 15 is a view describing a confirmation operation with the measurement and installation image 81 projected by the measurement and installation data indicating apparatus 50 (projector 56).

After that, the measurement and installation data indicating apparatus 50 (surveying system 10) is used for confirming the piling to each measurement and installation point 72 written in the target coordinate data 71 (coordinate data on target position). This will be described with reference to FIG. 15. FIG. 15 shows the same place as FIG. 8 in which the piles 86 are driven at the measurement and installation points 72 (721 to 724), respectively, and the measurement and installation image 81 (target information image 77) is projected. In FIG. 15, the pile 86 driven according to the measurement and installation point 722 of the first step 74*a* of the stairs 74 is shifted from the measurement and installation point 722, and the pile 86 driven according to another measurement and installation point 72 (721, 723, 724) is driven at an appropriate point. As illustrated in FIG. 15, the casing 51 (reference direction 51a) of the measurement and installation data indicating apparatus 50 is directed to the surveying instrument 20 in a position near the piled points.

The surveying instrument 20 repeats the tracking of the target 12 and the obtaining and the sending of the present coordinate data 75 through the repetition of Step S24, Step S25, Step S26, Step S27, and Step S24 in the flowchart of FIG. 13. The measurement and installation data indicating apparatus 50 projects the measurement and installation image 81 (refer to FIG. 8) including each target marking symbol 78 showing each measurement and installation point 72 according to a change in the position of the measurement and installation data indicating apparatus 50 (target 12) from the projector 56 while updating the measurement and installation image 81. The measurement and installation data indicating apparatus 50 then projects the measurement and installation image 81 as the target information image with the piled points as the projection plane 13.

In this case, as the measurement and installation data indicating apparatus 50 projects the measurement and installation image 81 (target information image 77) to fit to the shape of the projection plane 13 as described above, when the piles 86 are appropriately driven at the positions of the respective measurement and installation points 72 (721 to 724), the respective target marking symbols 78 showing these positions are projected on the upper end surfaces of the corresponding piles 86, respectively. In the example illustrated in FIG. 15, the target marking symbols 78 are projected on the upper end surfaces of the pile 86 driven at the flat part 73 and of the pile 86 driven at the second step 74b, respectively. The target marking symbol 78 is not projected on the upper end surface of the pile 86 driven at the first step 74a, and the target marking symbol 78 is projected in the position different from that of the pile 86 at the first step 74a. The operator thereby immediately and reliably confirms that the piles 86 are driven at the measurement and installation point 721 and the measurement and installation point 723, respectively, while the pile 86 is not appropriately driven at the measurement and installation point 722 by projecting the measurement and installation image 81 (target information image 77) with the piled points as the projection plane 13.

Figure 16:
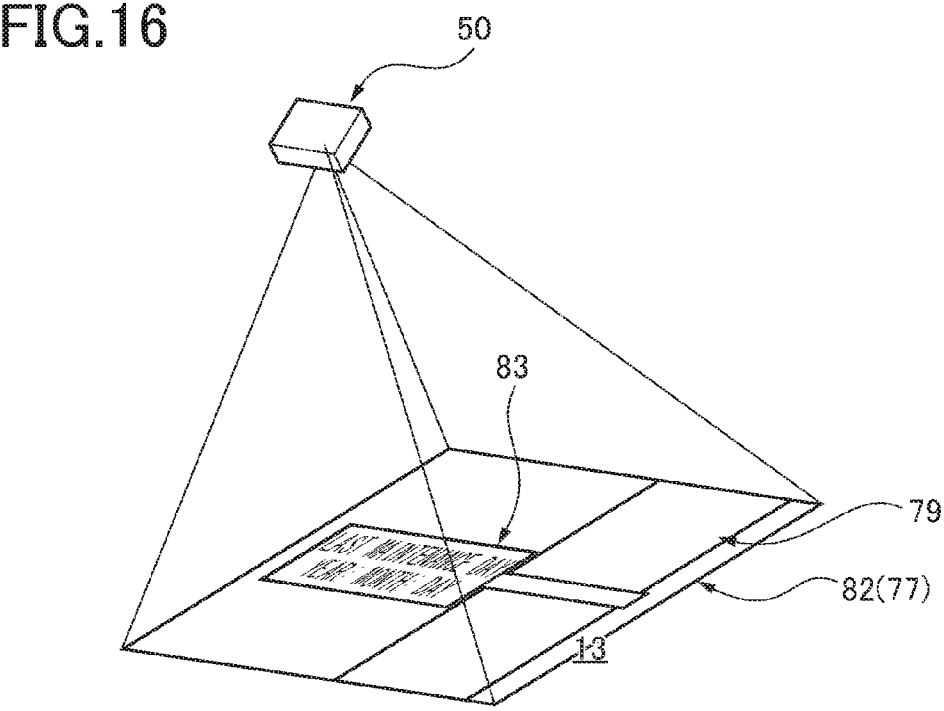
FIG. 16 is a view describing a structure image 82 (target information image 77) projected by the measurement and installation data indicating apparatus 50 (projector 56).

A pipe (refer to FIG. 16) provided under the floor as the target position is used as the structure, and the target coordinate data (not shown) showing the position and the shape of the pipe (structure) under the floor is used as the coordinate data for the measurement and installation data indicating apparatus 50 (surveying system 10). When the pipe (structure) is used as the target position instead of the measurement and installation point 72, the measurement and installation data indicating apparatus 50 and the surveying instrument 20 perform the operation similar to that using the target coordinate data 71 showing each measurement and installation point 72. The casing 51 (reference direction 51a) of the measurement and installation data indicating apparatus 50 is directed to the surveying instrument 20 near the pipe (structure). As illustrated in FIG. 16, the measurement and installation data indicating apparatus 50 projects the structure image 82 (target information image 77) including the target indicating picture 79 showing the pipe (structure) to fit to the shape of the floor as the projection plane 13. The operator therefore easily and accurately measures the position and the shape of the pipe (structure) based on the target indicating picture 79 of the projected structure image 82. When the target coordinate data (not shown) showing the position and the shape of the pipe (structure) includes the data on the pipe (structure), the measurement and installation data indicating apparatus 50 projects the structure data 83 showing the data on the structure shown by the target indicating picture 79 in the structure image 82. The structure data 83 represents the final maintenance day of the pipe (structure) shown by the target indicating picture 79 in the example illustrated in FIG. 16. The operator therefore easily obtains the data on the pipe (structure) shown by the target indicating picture 79 from the structure data 83 of the projected structure image 82.

Figure 17:
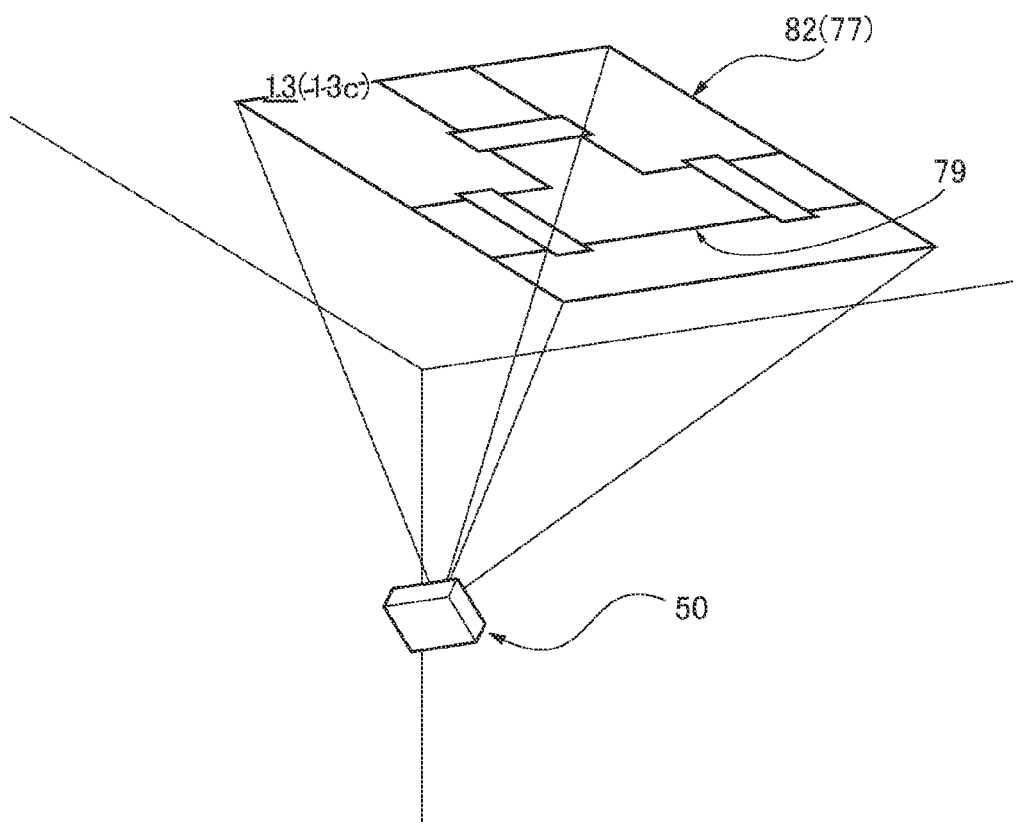
FIG. 17 is a view describing the structure image 82 (target information image 77) projected to a ceiling 13c by the measurement and installation data indicating apparatus 50 (projector 56).

A pipe (refer to FIG. 17) provided in the ceiling 13c as the target position is used as the structure, and the ceiling coordinate data (not shown) showing the position and the shape of the pipe (structure) in the ceiling 13c is used as the coordinate data for the measurement and installation data indicating apparatus 50 (surveying system 10). When the pipe (structure) is used as the target position instead of the measurement and installation point 72, the measurement and installation data indicating apparatus 50 and the surveying instrument 20 perform the operations similar to those using the target coordinate data 71 showing each measurement and installation point 72. In the measurement and installation data indicating apparatus 50, the projection optical axis 56a of the projector 56 is directed to the ceiling 13c and the casing 51 (reference direction 51a) is directed to the surveying instrument 20 near the pipe (structure). The measurement and installation data indicating apparatus 50 projects the structure image 82 (target information image 77) including the target indicating picture 79 showing the pipe (structure) to fit to the shape of the ceiling 13c as the projection plane 13, as illustrated in FIG. 17. In this case, when the ceiling 13c is seen from the underneath in the vertical direction, the structure image 82 (target information image 77) fits to the above ceiling coordinate data (not shown). The operator thereby easily and accurately measures the position and the shape of the pipe (structure) provided in the ceiling 13c based on the target indicating picture 79 of the projected structure image 82. Even when the structure image 82 is projected to the ceiling 13c, the structure data 83 can be projected as the example illustrated in FIG. 16. Moreover, even when a lighting appliance attached to the ceiling 13c as the target position is used as the structure, similar to the example in FIG. 17, the operator easily and accurately measures the position and the shape of the structure attached to the ceiling 13c based on the target indicating picture 79 of the projected structure image 82. For example, ceiling coordinate data seen from the back in the horizontal plan view may be used as long as it is coordinate data showing the position and the shape of the structure in the ceiling 13c.

Next, a handrail (refer to FIG. 18) provided in the wall 13w as the target position is the structure, and wall coordinate data (not shown) showing the position and the shape of the handrail (structure) in the wall 13w is used as the coordinate data for the measurement and installation data indicating apparatus 50 (surveying system 10). When the handrail (structure) is used as the target position instead of the measurement and installation point 72, the measurement and installation data indicating apparatus 50 and the surveying instrument 20 perform operations similar to those using the target coordinate data 71 showing each measurement and installation point 72. In the measurement and installation data indicating apparatus 50, the projection optical axis 56a of the projector 56 is directed to the wall 13w and the casing 51 (reference direction 51a) is directed to the surveying instrument 20 near the handrail (structure). The measurement and installation data indicating apparatus 50 projects the structure image 82 (target information image 77) including the target indicating picture 79 showing the handrail (not shown) to fit to the shape of the wall 13w as the projection plane 13. In this case, the structure image 82 (target information image 77) fits to the above wall coordinate data (not shown) when the wall 13w (projection plane 13) is seen in the direction orthogonal to the wall 13w. The operator therefore easily and accurately measures the position and the shape of the handrail (structure) attached to the wall 13w based on the target indicating picture 79 of the projected structure image 82. In addition, even when the structure image 82 is projected to the wall 13w, the structure data 83 is projected as the example illustrated in FIG. 16. Moreover, even when a pipe and a wiring provided behind the wall 13w as the target position are the structures, the operator easily and accurately measures the shape and the position of the structure provided behind the wall 13w based on the target indicating picture 79 of the projected structure image 82 similar to the example illustrated in FIG. 18.

Figure 18:
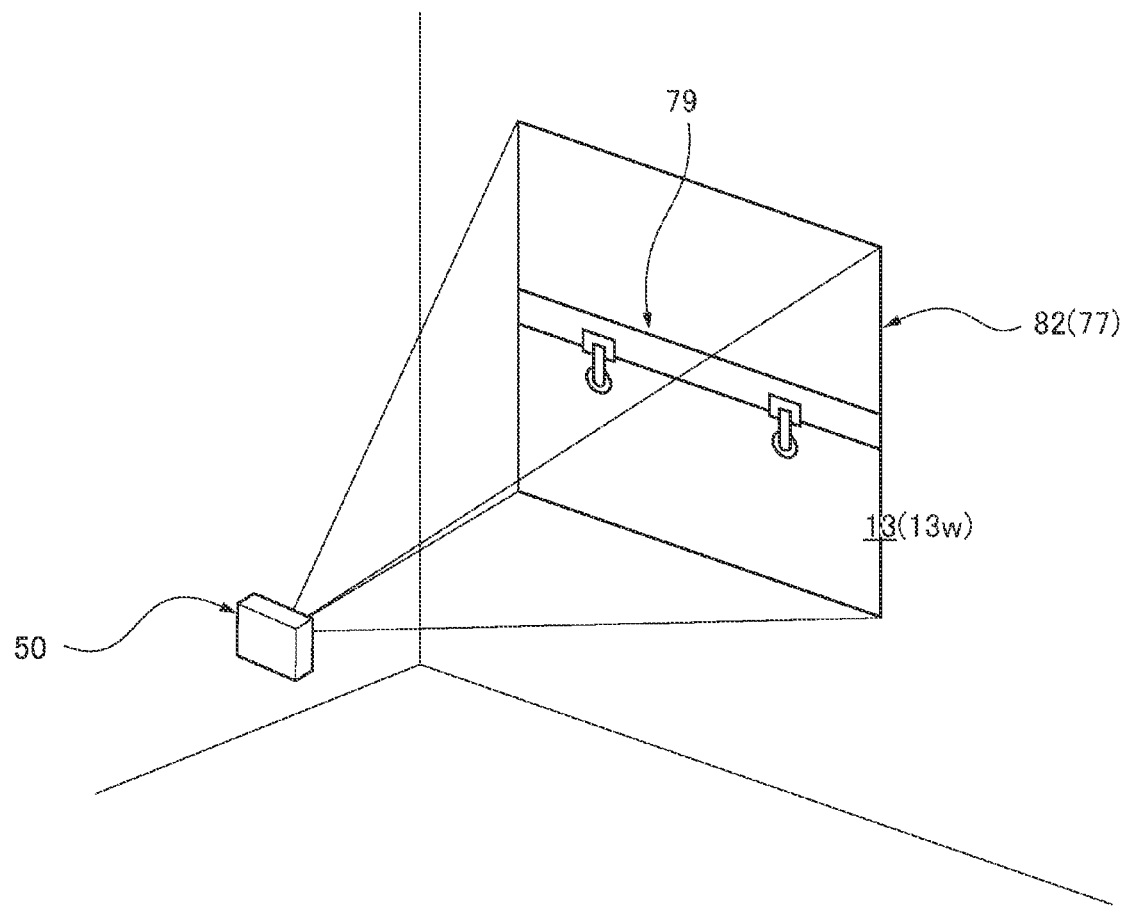
FIG. 18 is a view describing another structure image 82 (target information image 77) projected to a wall 13w by the measurement and installation data indicating apparatus 50 (projector 56).

In the example illustrated in FIG. 18, the handrail (structure) is provided in the wall 13w vertically rising from the floor. However, the wall 13w is not limited to that in Embodiment 1 as long as it rises from the floor. The rising angle may be close to the floor or the ceiling 13c, or smoothly continue to the floor or the ceiling 13c. The angle and the configuration of the wall 13w are not limited to those in Embodiment 1. The measurement and installation data indicating apparatus 50 (surveying system 10) therefore projects the target information image 77 in the omnidirectional direction, and the position and the shape of the target position in the omnidirectional direction are easily measured by using the combination of horizontal coordinate data (target coordinate data 71 as horizontal plane), the ceiling coordinate data, and the wall coordinate data. In the measurement and installation data indicating apparatus 50 (surveying system 10), three-dimensional coordinate data showing a three-dimensional figure as the coordinate data may be used instead of the combination of the horizontal coordinate data (target coordinate data 71 as horizontal plane view), the ceiling coordinate data, and the wall coordinate data. In this case, the surveying instrument 20 measures the three-dimensional coordinate position of the measurement and installation data indicating apparatus 50 as described above, and the measurement and installation data indicating apparatus 50 projects the target information image 77 to fit to the shape of the projection plane 13 based on the three-dimensional coordinate position measured by the surveying instrument 20. The measurement and installation data indicating apparatus 50 (surveying system 10) projects the target information image 77 in the omnidirectional direction similar to the case using the combination of the horizontal coordinate data (target coordinate data 71 as horizontal plane view), the ceiling coordinate data, and the wall coordinate data even when the above three-dimensional coordinate position is used. The position and the shape of the target position in the omnidirectional direction are thus easily measured.

As described above, in the measurement and installation data indicating apparatus 50 as one embodiment of the measurement and installation data indicating apparatus according to the present invention, the target information image 77 is corrected based on the distance image data 62 obtained by the distance image sensor 55 and the inclination data 61 obtained by the inclination sensor 54 (inclination data obtaining part) to fit to the shape of the projection plane 13, and the corrected target information image 77 is projected by the projector 56. The measurement and installation data indicating apparatus 50 thereby appropriately projects the target information image 77 related to the target position on the projection plane 13 regardless of the irregularity and the inclination of the projection plane 13. The position of the target position is thus accurately measured.

The measurement and installation data indicating apparatus 50 allows the operator to measure the position of the target position with the target information image 77 appropriately projected on the operation plane as the projection plane 13. Such a target information image 77 eliminates the need for the comparison between the display 58 and the actual operation plane as the case in which the image related to the target position is only displayed on the display 58 of the measurement and installation data indicating apparatus 50. The position of the target position is thus easily and accurately measured.

The measurement and installation data indicating apparatus 50 appropriately projects the target information image 77 related to the target position regardless of the irregularity and the inclination of the projection plane 13. The position of the target position is thus accurately measured without being moved just above the target position (vertical above position). The measurement and installation data indicating apparatus 50 allows the operator to effectively and accurately measure the position of the target position. A time required for the operation of such measurement may be reduced.

The measurement and installation data indicating apparatus 50 fits the target information image 77 to the shape of the projection plane 13 by associating the projection plane 13 on which the target information image 77 is projected with the coordinate data (target coordinate data 71) in the direction orthogonal to the projection plane 13. The measurement and installation data indicating apparatus 50 appropriately reflects the position of each target position in the coordinate data (target coordinate data 71) on the actual projection plane 13. The operator thus accurately measures the position of the target position.

In the measurement and installation data indicating apparatus 50, the detection optical axis 55a of the distance image sensor 55 is aligned with the projection optical axis 56a of the projector 56. The distance image sensor 55 thereby obtains the distance image data 62 in the direction in which the projector 56 actually projects the image. In the measurement and installation data indicating apparatus 50, the calculation for correcting the target information image 77 to fit to the shape of the projection plane 13 is therefore simplified, and the target information image 77 is appropriately corrected to conform to the shape of the projection plane 13 on which the target information image 77 is accurately projected.

The measurement and installation data indicating apparatus 50 includes a predetermined range centered at the detection optical axis 55a of the distance image sensor 55 and a predetermined range centered at the projection optical axis 56a of the projector 56. In the measurement and installation data indicating apparatus 50, the three-dimensional structure (distance image data 62) on the projection plane 13 on which the target information image 77 is projected by the projector 56 is reliably obtained by the distance image sensor 55. In the measurement and installation data indicating apparatus 50, the calculation for correcting the target information image 77 to fit to the shape of the projection plane 13 is further simplified, and the target information image 77 is further appropriately corrected to fit to the shape of the projection plane 13 on which the target information image 77 is actually projected.

In the measurement and installation data indicating apparatus 50, the inclination sensor 54 is configured by a three-axis acceleration sensor that detects the acceleration in the three directions of u, v, w axes, and one axis (u-axis) of the detectable three axes is aligned with the detection optical axis 55a of the distance image sensor 55 and the projection optical axis 56a of the projector 56. In the measurement and installation data indicating apparatus 50, the calculation for correcting the target information image 77 to conform to the shape of the projection plane 13 based on the inclination of the projection optical axis 56a and the detection optical axis 55a detected by the inclination sensor 54 is therefore simplified.

In the measurement and installation information indicating apparatus 50, when the target position is the measurement and installation point 72, the measurement and installation image 81 including the target marking symbol 78 showing the position of the measurement and installation point 72 is generated as the target information image 77, and the measurement and installation image 81 is projected by the projector 56. The measurement and installation image 81 is projected on the projection plane 13 regardless of the inclination and the irregularity of the projection plane 13, and the target marking symbol 78 showing the position of the measurement and installation point 72 is projected on the appropriate position. The position of the measurement and installation point 72 is thus accurately measured.

In the measurement and installation data indicating apparatus 50, it is immediately and reliably confirmed whether or not the pile 86 is appropriately driven in the position of each measurement and installation point 72 by projecting the measurement and installation image 81 as the target information image 77 with the piled point as the projection plane 13.

In the measurement and installation data indicating apparatus 50, when the target position does not present in the range in which the projector 56 projects the image on the projection plane 13, the guide image 84 that guides the operator from the present position to the target position is generated, and the guide image 84 is projected by the projector 56. The measurement and installation data indicating apparatus 50 guides the operator near the target position with the guide image 84 projected on the operation plane as the projection plane 13. Such a guide image 84 eliminates the need for the comparison between the display 58 and the actual operation plane as in the case in which the guide image is only displayed on the display 58 of the measurement and installation data indicating apparatus 50. The operator thus easily and appropriately reaches to the target position.

In the measurement and installation data indicating apparatus 50, when the target position is the structure, the structure image 82 including the target marking symbol 70 showing the position and the shape of the structure is generated as the target information image 77, and the structure image 82 is projected by the projector 56. The measurement and installation data indicating apparatus 50 therefore projects the structure image 82 on the projection plane 13 regardless of the inclination and the irregularity of the projection plane 13, and projects the target indicating picture 79 showing the position and the shape of the structure in an appropriate position with an appropriate shape. The measurement and installation data indicating apparatus 50 thereby accurately measures the position and the shape of the structure.

When the target position is the structure, the measurement and installation data indicating apparatus 50 projects the structure data 83 showing the data regarding the structure shown by the target indicating picture 79 in the structure image 82 as the target information image 77. The measurement and installation data indicating apparatus 50 therefore easily and accurately obtains the data regarding the structure as well as the shape and position of the structure.

The measurement and installation data indicating apparatus 50 sets the projection maximum distance 85 at which the projector 56 projects the target information image 77. In the measurement and installation data indicating apparatus 50, the target information image 77 is partially omitted in a part of the projection plane 13 exceeding the projection maximum distance 85, and the projector 65 projects the target information image 77 in which the part exceeding the projection maximum distance 85 is partially omitted. The measurement and installation data indicating apparatus 50 therefore projects no light to the part exceeding the projection maximum distance 85 and forms no target information image 77. The power of the measurement and installation data indicating apparatus 50 can be thus saved.

In the measurement and installation data indicating apparatus 50, when the coordinate data is the horizontal coordinate data (target coordinate data 71 as horizontal plane view), the target information image 77 fits to the shape of the projection plane 13 by associating the projected target information image 77 with the horizontal coordinate data (target coordinate data 71) when the projection plane 13 is seen from the above in the vertical direction. For example, in the measurement and installation operation using the horizontal plane view, the measurement and installation data indicating apparatus 50 further easily and appropriately measures the position of the measurement and installation point 72 (target position).

When the coordinate data is the ceiling coordinate data, the measurement and installation data indicating apparatus 50 fits the target information image 77 to the shape of the projection plane 13 by associating the projected target information image 77 with the ceiling coordinate data when the ceiling 13c as the projection plane 13 is seen from the underneath in the vertical direction. The measurement and installation data indicating apparatus 50 therefore easily and appropriately measures the position and the shape of the structure attached to the ceiling 13c and the structure attached in the ceiling 13c.

When the coordinate data is the wall coordinate data in the wall 13w rising from the floor, the measurement and installation data indicating apparatus 50 fits the target information image 77 to the shape of the projection plane 13 by associating the projected target information image 77 with the wall coordinate data when the wall 13w as the projection plane 13 is seen in the direction orthogonal to the wall 13w. The measurement and installation data indicating apparatus 50 easily and appropriately measures the position and the shape of the structure provided behind the wall 13w and the structure provided in the wall 13w.

The measurement and installation data indicating apparatus 50 projects the target information image 77 in the omnidirectional direction by using the combination of the horizontal coordinate data (target coordinate data 71 as horizontal plane view), the ceiling coordinate data, and the wall coordinate data. The measurement and installation data indicating apparatus 50 therefore easily measures the position and the shape of the target position provided in the omnidirectional direction.

The measurement and installation data indicating apparatus 50 projects the target information image 77 in the omnidirectional direction by using the three-dimensional coordinate data showing the three-dimensional figure as the coordinate data. The measurement and installation data indicating apparatus 50 therefore easily measures the position and the shape of the target position provided in the omnidirectional direction.

The measurement and installation data indicating apparatus 50 obtains the coordinate data of the target position (target coordinate data 71) from the surveying instrument 20 (surveying instrument controller 37) through the communication part 57, and also obtains the data (present coordinate data 75) on the position of the target 12 measured by the surveying instrument 20 as the coordinate data on the present position. The measurement and installation data indicating apparatus 50 corrects the target information image 77 to fit to the shape of the projection plane 13 by using the present position (present coordinate data 75) measured by the surveying instrument 20, and projects the corrected target information image 77 by the projector 56. The measurement and installation data indicating apparatus 50 therefore corrects the target information image 77 to fit to the shape of the projection plane 13 based on the appropriate present position (present coordinate data 75), and projects the corrected target information image 77 by the projector 56. The measurement and installation data indicating apparatus 50 thereby further appropriately projects the target information image 77 related to the target position on the projection plane 13 regardless of the irregularity and inclination of the projection plane 13, and accurately measures the position of the target position.

The measurement and installation data indicating apparatus 50 uses, as the coordinate data on the present position, the corrected coordinate data 76 in which the present position (present coordinate data 75) obtained from the surveying instrument 20 (surveying instrument controller 37) is obtained based on the relationship of the center position of the target 12, the reference position of the distance image sensor 55, and the reference position of the projector 56. The measurement and installation data indicating apparatus 50 corrects the target information image 77 to fit to the shape of the projection plane 13 by using the corrected coordinate data 76, and projects the corrected target information image 77 to the projector 56. The measurement and installation data indicating apparatus 50 therefore corrects the target information image 77 to fit to the shape of the projection plane 13 based on the present position (corrected coordinate data 76) of the reference position of the projector 56, and projects the corrected target information image 77 by the projector 56. The measurement and installation data indicating apparatus 50 thereby further appropriately projects the target information image 77 related to the target position on the projection plane 13 regardless of the inclination and the irregularity of the projection plane 13, and more accurately measures the position of the target position.

The measurement and installation data indicating apparatus 50 executes the measurement and installation data indicating method including a process of correcting the target information image 77 related to the target position seen from the present position based on the coordinate data (target coordinate data 71) to fit to the shape of the projection plane 13 based on the inclination data 61 obtained by the inclination sensor 54 (inclination data obtaining part) and the distance image data 62 obtained by the distance image sensor 55 and a process of projecting the corrected target information image 77 by the projector 56. The measurement and installation data indicating apparatus 50 therefore appropriately projects the target information image 77 related to the present position on the projection plane 13 regardless of the irregularity and the inclination of the projection plane 13, and accurately measures the position of the projection position.

The measurement and installation data indicating apparatus 50 as one embodiment of the measurement and installation data indicating apparatus according to the present invention easily and appropriately measures the target position such as the measurement and installation point 72.

Embodiment 2

A measurement and installation data indicating apparatus 50A as a measurement and installation data indicating apparatus of Embodiment 2 of the present invention, and a surveying system 10 using the same will be described with reference to FIG. 19. The measurement and installation data indicating apparatus 50A of Embodiment 2 measures the direction of the detection optical axis 55a of the distance image sensor 55 and the projection optical axis 56a of the projector 56. As the basic configuration and operation of the measurement and installation data indicating apparatus 50A of Embodiment 2 are similar to those of the measurement and installation data indicating apparatus 50 of Embodiment 1, the same reference numbers are added to the similar configurations, and the detailed description thereof will be omitted. As the surveying system 10 of Embodiment 2 is similar to that of Embodiment 1 except the measurement and installation data indicating apparatus 50A of Embodiment 2 is used instated of the measurement and installation data indicating apparatus 50, FIG. 1 is used and the detailed description thereof will be omitted.

Figure 19:
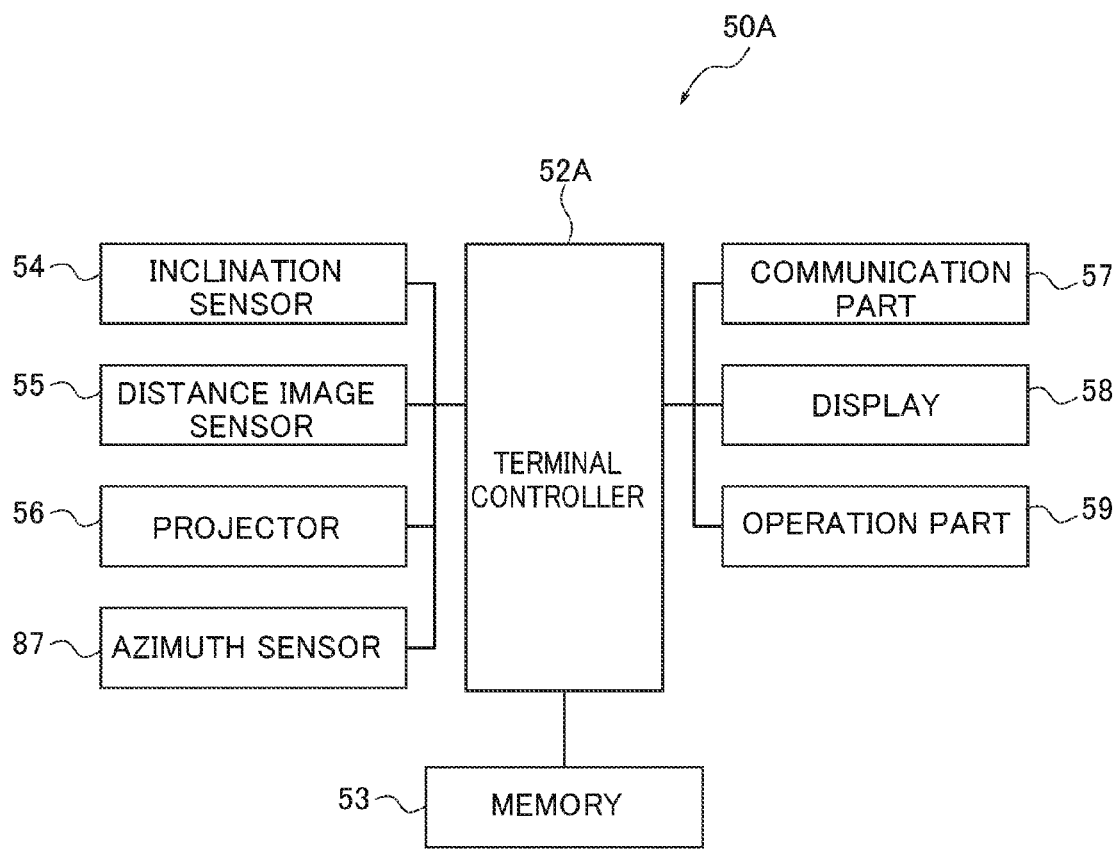
FIG. 19 is a block diagram showing an internal configuration of a measurement and installation data indicating apparatus 50A in Embodiment 2.

As illustrated in FIG. 19, in the measurement and installation data indicating apparatus 50A, an azimuth sensor 87 is connected to a terminal controller 52A in addition to the memory 53, the inclination sensor 54, the distance image sensor 55, the projector 56, the communication part 57, the display 58, and the operation part 59. The azimuth sensor 87 detects the north direction by detecting the earth magnetism, namely, obtains the direction on the earth. In Embodiment 2, the azimuth sensor 87 is fixed in the casing 51, obtains the direction of the reference direction 51a (refer to FIG. 3) of the casing 51, and outputs the obtained direction data to the terminal controller 52A. The terminal controller 52A thereby measures the direction of the casing 51 (reference direction 51a), namely, the measurement and installation data indicating apparatus 50A. The terminal controller 52A therefore measures the direction of the detection optical axis 55a of the distance image sensor 55 and the projection optical axis 56a of the projector 56.

The terminal controller 52A obtains the direction of the detection optical axis 55a of the distance image sensor 55 and the projection optical axis 56a of the projector 56 based on the azimuth data from the azimuth sensor 87. The terminal controller 52A therefore obtains the absolute position of the measurement and installation data indicating apparatus 50A and the absolute position of the distance image sensor 55 and the projector 56 (reference position) based on the present coordinate data 75 without directing the casing 51 (reference direction 51a) to the surveying instrument 20. The terminal controller 52A thereby obtains the coordinate position (corrected coordinate data 76) of the measurement and installation data indicating apparatus 50A and the position (distance and direction) of each target position (measurement and installation point 72) relative to the measurement and installation data indicating apparatus 50A by using the target coordinate data 71 with the direction of the casing 51 (reference direction 51a) as a standard. The terminal controller 52A therefore appropriately projects the target information image 77 related to the target position on the projection plane 13 regardless of the irregularity and the inclination of the projection plane 13 without directing the casing 51 (reference direction 51a) to the surveying instrument 20.

As the measurement and installation data indicating apparatus 50A in Embodiment 2 has the configuration similar to that of the measurement and installation data indicating apparatus 50 in Embodiment 1, the measurement and installation data indicating apparatus 50A in Embodiment 2 basically obtains the effect similar to that in Embodiment 1.

In addition to that, in the measurement and installation data indicating apparatus 50A of Embodiment 2, the terminal controller 52A obtains the direction of the detection optical axis 55a of the distance image sensor 55 and the projection optical axis 56a of the projector 56 based on the azimuth data from the azimuth sensor 87. As the casing 51 (reference direction 51a) is not required to be directed to the surveying instrument 20, the usability of the measurement and installation data indicating apparatus 50A is improved. The measurement and installation data indicating apparatus 50A projects the target information image 77 on the projection plane 13 more appropriately and easier than the measurement and installation data indicating apparatus in which the casing 51 is appropriately directed to the surveying instrument 20. The measurement and installation data indicating apparatus 50A further easily and accurately measures the position of the target position. In the measurement and installation data indicating apparatus 50A of Embodiment 2, the target 12 is an all-around (360°) prism, and reflects the light (measurement light and tracking light) along all incident directions. The freedom degree of the direction relative to the surveying instrument 20 is thereby improved, and the usability is also improved.

The target position of the measurement and installation point 72 is appropriately and easily measured in the measurement and installation data indicating apparatus 50A of Embodiment 2 of the measurement and installation data indicating apparatus according to the present invention.

Embodiment 3

Figure 24:
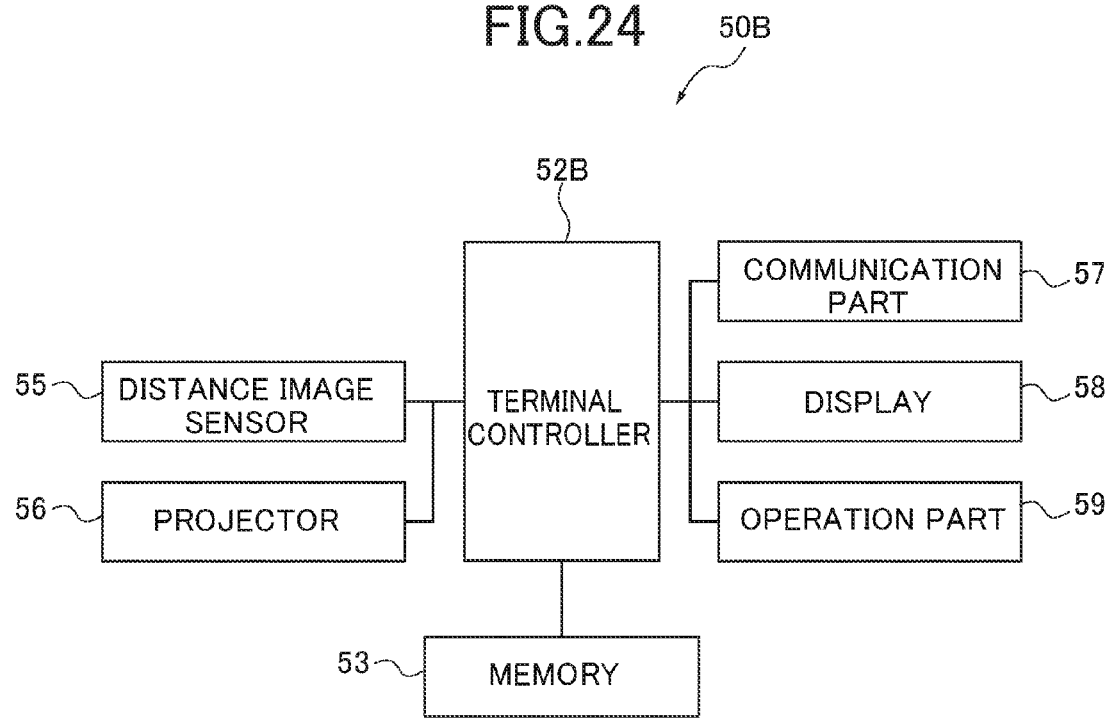
FIG. 24 is a block diagram showing the internal configuration of the measurement and installation data indicating apparatus 50B.
Figure 25A:
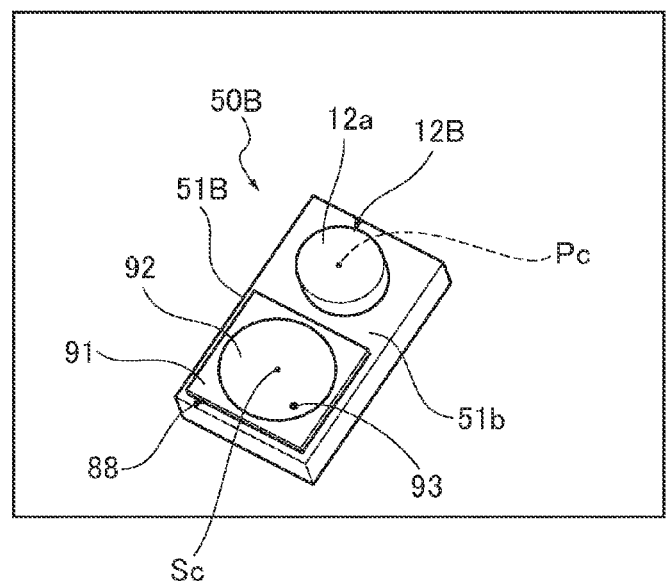
FIG. 25A is a view illustrating an image of a target 12B and the inclination sheet 88 (measurement and installation data indicating apparatus 50B) obtained by an imaging part 29.
Figure 25B:
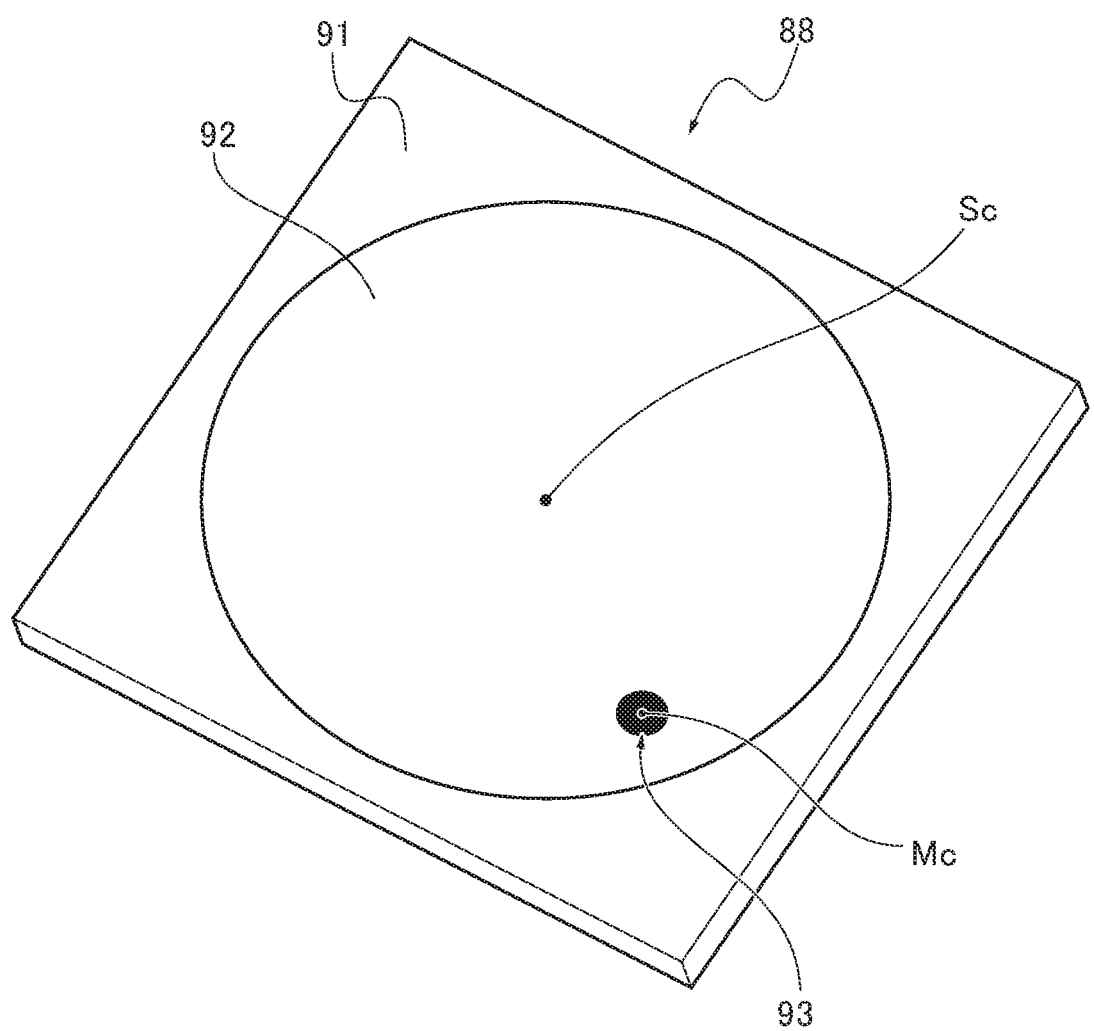
FIG. 25B is a view illustrating a center position Sc of the inclination sheet 88 and a center position Mc of the inclination symbol 93.

Next, a measurement and installation data indicating apparatus 50B as a measurement and installation data indicating apparatus of Embodiment 3 of the present invention, and a surveying system 10B using the same will be described with reference to FIGS. 20 to 25 (FIGS. 25A and 25B). The measurement and installation data indicating apparatus 50B of Embodiment 3 measures the inclination of the detection optical axis 55a of the distance image sensor 55 and the inclination (direction and degree) of the projection optical axis 56a of the projector 56 without using a sensor (detector (inclination sensor 54 in Embodiments 1, 2)) which outputs an inclination as electric signals. As the basic configuration of the measurement and installation data indicating apparatus 50B of Embodiment 3 is similar to that of the measurement and installation data indicating apparatus 50 in Embodiment 1, the same reference numbers are applied to the similar configurations, and the detailed description thereof will be omitted. As the surveying system 10 of Embodiment 3 is similar to that of Embodiment 1 except that the measurement and installation data indicating apparatus 50B of Embodiment 3 is used instead of the measurement and installation data indicating apparatus 50, the detailed description thereof will be omitted.

Figure 20:
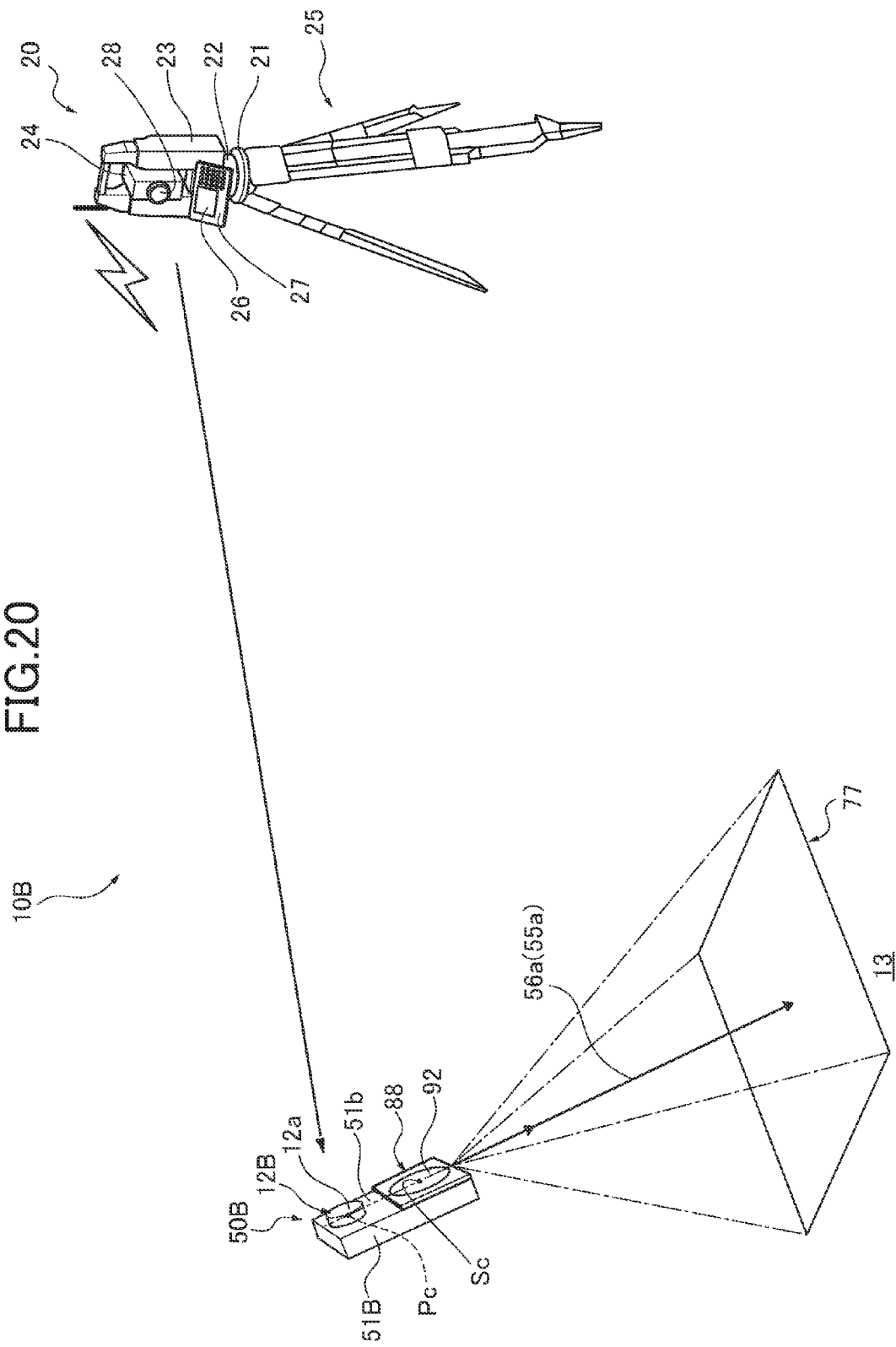
FIG. 20 is a schematic view illustrating a configuration of a surveying system 10B with a measurement and installation data indicating apparatus 50B and the surveying instrument 20 in Embodiment 3 as one example of the measurement and installation data indicating apparatus according to the present invention.

In Embodiment 3, the measurement and installation data indicating apparatus 50B is housed in a casing 51B having a rectangular shape, and a target 12B and an inclination sheet 88 are provided in a front surface 51b of the casing 51B, as illustrated in FIG. 20. In Embodiment 3, the target 12B and the inclination sheet 88 are provided in the casing 51B such that a center position Pc of the target 12B and a center position Sc of a symbol appearing plane 92 of the inclination sheet 88 are located on the detection optical axis 55a of the distance image sensor 55 and the projection optical axis 56a (extended line) of the projector 56. The measurement and installation data indicating apparatus 50B does not have the surveying pole 11 (refer to FIG. 1). An operator holds the casing 51B for moving. The configuration of the measurement and installation data indicating apparatus 50B is not limited to Embodiment 3. The surveying pole 11 may be provided in the measurement and installation data indicating apparatus 50B similar to Embodiment 1.

In Embodiment 3, the target 12B is configured by a single corner cube prism, and includes the front surface 51b and an incident plane 12a parallel to the front surface 51b. Upon the incident of the light (measurement light and tracking light) from the incident plane 12a, the target 12B basically reflects the light along the incident direction. The target 12B is a measurement target whose position is measured by reflecting the distance measurement light from the distance measurement part 31 of the surveying instrument 20, and also is a tracking target to which the telescope part 24 is always directed (tracked) by reflecting the tracking light from the tracking part 32 of the surveying instrument 20. The surveying instrument 20 therefore measures the coordinate position (three-dimensional coordinate position) of the target 12B (center position Pc) by the distance measurement part 31, and obtains the present coordinate data 75 as the coordinate data on the present position of the target 12B (center position Pc). In the surveying instrument 20, the telescope part 24 is always directed (tracked) to the target 12B (center position Pc) by the tracking part 32. The center position Pc is a floating point as a virtual point which is immovably recognized even if the target 12B (incident plane 12a) inclines from the facing state to the surveying instrument 20.

Figure 21:
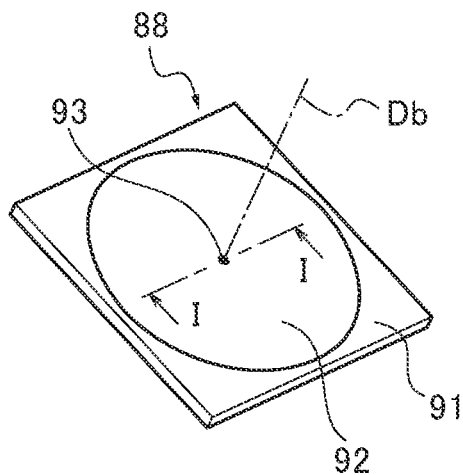
FIG. 21 is a schematic view illustrating an inclination sheet 88 provided in the measurement and installation data indicating apparatus 50B.
Figure 22A:
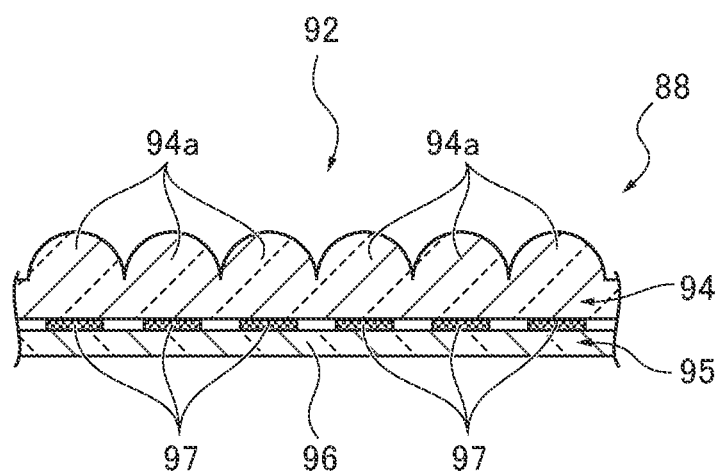
FIG. 22A is a sectional view obtained along I-I line in FIG. 21.
Figure 22B:
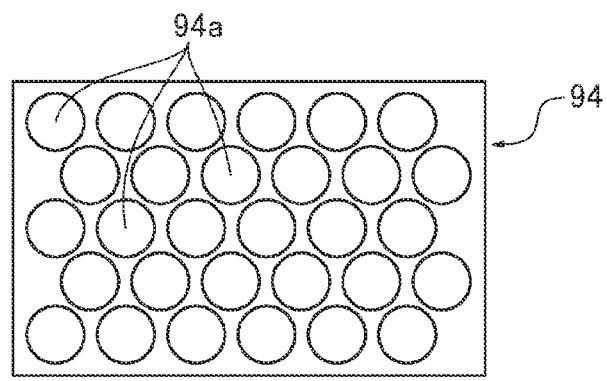
FIG. 22B is a front view of a light collecting layer 94 of the inclination sheet 88.

As illustrated in FIG. 21, the inclination sheet 88 includes a thin base plate 91 having a square shape in a front view and the circular symbol appearing plane 92 provided on the base plate 91. In the inclination sheet 88, an inclination symbol 93 appears on the symbol appearing plane 92. An inclination angle relative to the visual line direction is analyzed by changing the position of the inclination symbol 93 on the symbol appearing plane 92 according to the own inclination. As illustrated in FIG. 22A, the symbol appearing plane 92 includes a light collecting layer 94 and an image forming layer 95 which are laminated to each other. The light collecting layer 94 is a so-called lens array having a plurality of light collecting parts 94a as a plane-convex lens arranged in a honeycomb manner or a matrix manner. The imaging position of each light collecting part 94a is formed on the image forming layer 95. As illustrated in FIG. 22B, a plurality of light collecting parts 94a is arranged in a honeycomb manner in the light collecting layer 94 of Embodiment 3.

Figure 22C:
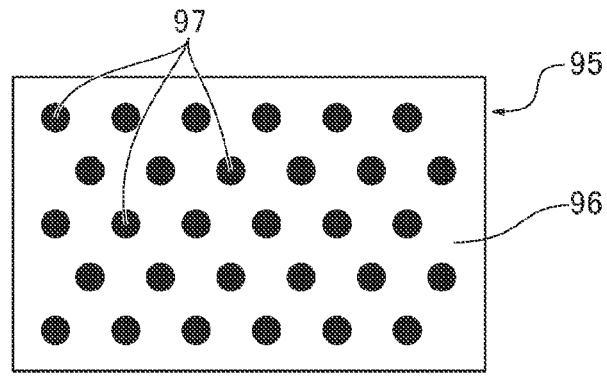
FIG. 22C is a front view of an image forming layer 95 of the inclination sheet 88.
Figure 23A:
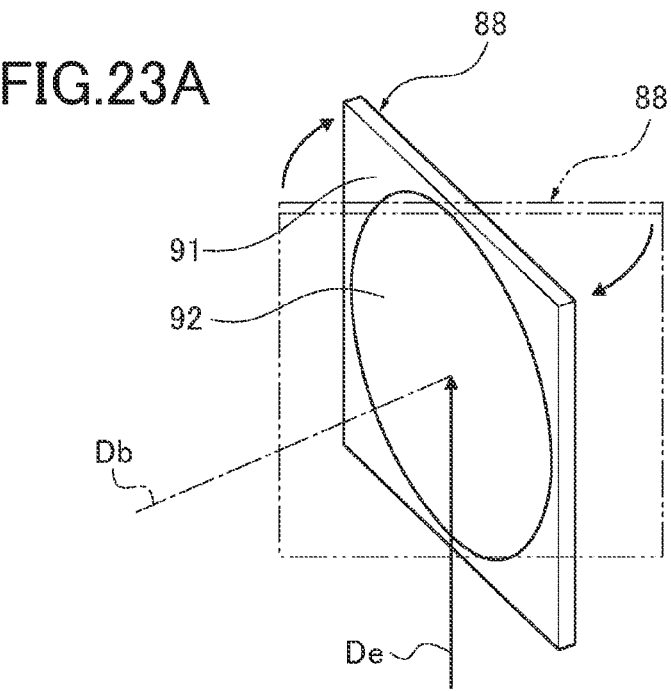
FIG. 23A is a view showing the inclination sheet 88 (reference direction Db) inclined on the left side relative to a visual line direction De.
Figure 23B:
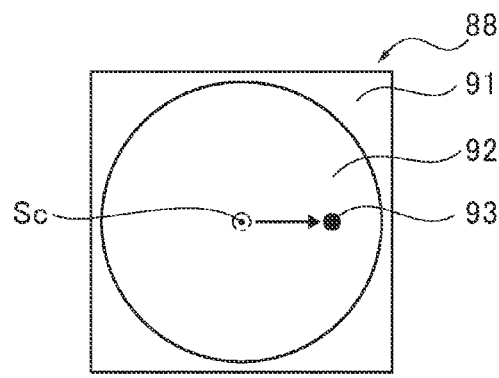
FIG. 23B is a view showing an inclination symbol 93 displaced on a symbol appearance plane 92 of the inclination sheet 88 in FIG. 23A.
Figure 23C:
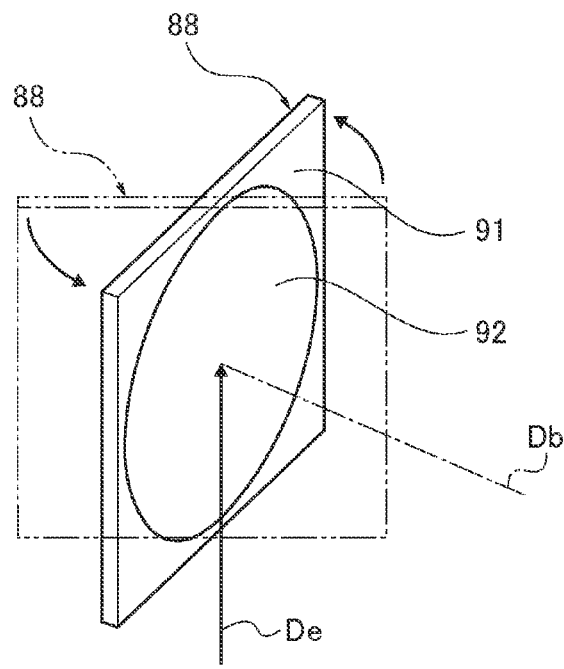
FIG. 23C is a view showing the inclination sheet 88 (reference direction Db) inclined on the right side relative to the visual line direction De.
Figure 23D:
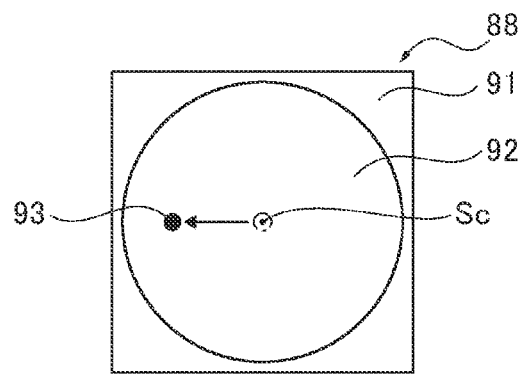
FIG. 23D is a view showing the inclination symbol 93 displaced on the symbol appearance plane 92 of the inclination sheet 88 in FIG. 23C.

As illustrated in FIGS. 21 and 22C, the image forming layer 95 includes a translucent flat plate image forming medium 96 and a plurality of symbol forming parts 97 as symbols having a shape similar to that of the inclination symbols 93. A plurality of symbol forming parts 97 is formed on the image forming medium 96 by printing. The image forming medium 96 (image forming layer 95) is configured by a translucent material, and is attached to the rear surface of the light collecting layer 94 (surface opposite to surface provided with each light collecting part 94a) by adhesive agent, for example, through each symbol forming part 97 provided on the top surface of the image forming medium 96. The symbol forming parts 97 correspond to the light collecting parts 94a of the light collecting layer 94 one by one in the lamination direction, and are arranged in a honeycomb manner at intervals slightly narrower than the intervals of the light collecting parts 94a in every direction in the front view of FIG. 22C (FIG. 22B) with the center position as a standard.

The symbol formed as each symbol forming part 97 appears on the symbol appearing plane 92 (inclination sheet 88) as the inclination symbol 93 through each light collecting part 94a of the light collecting layer 94 (refer to FIG. 21). The normal direction is used as a reference direction Db on the symbol appearing plane 92. When the visual line direction De inclines relative to the reference direction Db, the inclination symbol 93 displaces in the inclination direction by the amount according to the inclination. More specifically, when the inclination sheet 88 (reference direction Db) inclines on the left side relative to the visual line direction De (refer to FIG. 23A), the visual line direction De inclines on the right side relative to the reference direction Db, and the inclination symbol 93 displaces on the right side at a distance according to the inclination in the symbol appearing plane 92 (refer to FIG. 23B). When the inclination sheet 88 (reference direction Db) inclines on the right side relative to the visual line direction De (refer to FIG. 23C), the visual line direction De inclines on the left side relative to the reference direction Db, and the inclination symbol 93 displaces on the left side at a distance according to the inclination on the symbol appearing plane 92 (refer to FIG. 23D). In the inclination sheet 88, the inclination (direction and degree) of the reference direction Db relative to the visual line direction De is analyzed by obtaining the position of the inclination symbol 93 on the symbol appearing plane 92. As the detailed analysis (calculation) of the inclination (direction and degree) of the reference direction Db relative to the visual line direction De is known analysis, the detailed description thereof will be omitted. The inclination sheet 88 and the target 12B are fixed to the casing 51B. The positional relationship of the inclination sheet 88 and the target 12B relative to the casing 51B is constant, and the positional relationship between the inclination sheet 88 and the target 12B is also constant.

As illustrated in FIG. 24, the measurement and installation data indicating apparatus 50B is not provided with the inclination sensor 54 as the inclination sheet 88 is provided in the casing 51B. The surveying system 10B (surveying instrument controller 37 (refer to FIG. 2)) thereby obtains the direction and degree of the inclination of the measurement and installation data indicating apparatus 50B by using the inclination sheet 88. This will be described with reference to FIGS. 25A and 25B.

When the surveying instrument 20 obtains the present coordinate data 75 on the target 12B (Step S25 of flowchart in FIG. 13), the surveying instrument 20 obtains the image (telescope image) of the inclination sheet 88 together with the target 12B in the collimation direction by the imaging part 29 through the optical path system of the telescope 28 of the telescope part 24 (refer to FIG. 25A). The surveying instrument controller 37 obtains the center position Pc of the target 12B and the center position Sc of the symbol appearing plane 92 of the inclination sheet 88 in the image through image analysis, and obtains the direction of the inclination sheet 88 (base plate 91 and symbol appearing plane 92) from the positional relationship, as illustrated in FIG. 25A. The surveying instrument controller 37 obtains the relationship (displacement and displaced direction) of the direction of the center position Sc (inclination sheet 88) relative to the collimation direction based on the present coordinate data 75 on the center position Pc of the target 12B in the collimation direction and the positional relationship between the center position Pc and the center position Sc. The surveying instrument controller 37 also obtains the center position Mc of the inclination symbol 93 appearing on the symbol appearing plane 92 through the image analysis, and obtains the displacement and the direction of the center position Mc relative to the center position Sc, as illustrated in FIG. 25B. The surveying instrument controller 37 corrects the displacement and the direction of the center position Mc relative to the center position Sc according to the relationship of the direction of the center position Sc relative to the collimation direction, and obtains the inclination of the inclination sheet 88 (degree and direction) relative to the collimation direction of the telescope 28 based on the corrected displacement and direction and the direction of the inclination sheet 88. In the image obtained by the imaging part 29, as the center position Pc of the target 12B is positioned in the collimation direction of the imaging part 29, the visual line direction De relative to the inclination sheet 88 (symbol appearing plane 92) is the direction toward the center position Sc (inclination sheet 88) from the imaging part 29. The surveying instrument controller 37 thereby obtains the inclination (direction and degree) of the inclination sheet 88 relative to the collimation direction of the telescope 28, and sends the obtained inclination of the inclination sheet 88 (direction and degree (data)) when sending the present coordinate data 75 to the terminal controller 52B (Step S26 in flowchart of FIG. 13).

The terminal controller 52B therefore obtains the inclination (direction and degree) of the inclination sheet 88 from the surveying instrument controller 37 (corresponding to Step S3 in flowchart of FIG. 12). The terminal controller 52B thereby obtains the inclination (direction and degree) of the measurement and installation data indicating apparatus 50B based on the obtained inclination of the inclination sheet 88, and obtains the direction of the reference direction 51a provided in the casing 51B, the detection optical axis 55a of the distance image sensor 55, and the projection optical axis 56a of the projector 56. The inclination sheet 88 therefore operates. The terminal controller 52B thereby obtains the absolute position of the measurement and installation data indicating apparatus 50B and the absolute position of the distance image sensor 55 and the projector 56 (reference position) based on the present coordinate data 75 from the surveying instrument 20 without directing the reference direction 51a of the casing 51B to the surveying instrument 20 and using the sensor which outputs electric signals. The terminal controller 52B therefore obtains the coordinate position (corrected coordinate data 76) of the measurement and installation data indicating apparatus 50B and the position of each target position (measurement and installation point 72) relative to the measurement and installation data indicating apparatus 50B by using the target coordinate data 71 with the direction and the degree of the inclination of the casing 51B (reference direction 51a) as a standard. The terminal controller 52B appropriately projects, on the projection plane 13, the target information image 77 related to the target position regardless of the irregularity and the inclination of the projection plane 13 without directing the reference direction 51a in the surveying instrument 20 and using the sensor that outputs as the electric signals.

As the measurement and installation data indicating apparatus 50B of Embodiment 3 has the basic configuration similar to that of the measurement and installation data indicating apparatus 50 of Embodiment 1, the measurement and installation data indicating apparatus 50B of Embodiment 3 basically has the effects similar to that of the measurement and installation data indicating apparatus 50 of Embodiment 1.

In the measurement and installation data indicating apparatus 50B of Embodiment 3, the terminal controller 52B obtains the inclination (direction and degree) of the inclination sheet 88 obtained by the surveying instrument controller 37 of the surveying instrument 20. The terminal controller 52B therefore obtains the inclination (direction and degree) of the measurement and installation data indicating apparatus 50B based on the inclination (direction and degree) of the inclination sheet 88, and also obtains the direction of the detection optical axis 55a of the distance image sensor 55 and the projection optical axis 56a of the projector 56. In the measurement and installation data indicating apparatus 50B, it is not necessary to direct the casing 51B (reference direction 51a) to the surveying instrument 20. The usability of the measurement and installation data indicating apparatus 50B is therefore improved. In the measurement and installation data indicating apparatus 50B, it is not necessary to use the sensor which outputs as electric signals such as the inclination sensor 54 of Embodiments 1, 2 and the azimuth sensor 87 of Embodiment 2. The measurement and installation data indicating apparatus 50B is therefore simplified at lower costs. The measurement and installation data indicating apparatus 50B uses the inclination (direction and degree) of the inclination sheet 88 obtained from the position of the inclination symbol 93 on the symbol appearing plane 92. The target information image 77 is projected on the projection plane 13 more appropriately and easier than the case in which the casing 51B (reference direction 51a) is appropriately and continuously directed to the surveying instrument 20. In addition, in the measurement and installation data indicating apparatus 50B, the inclination sheet 88 is a thin plate member. The entire configuration of the measurement and installation data indicating apparatus 50B is downsized, and the operation performance of the apparatus is improved. The measurement and installation data indicating apparatus 50B thereby easily and accurately measures the position of the target position.

In the measurement and installation data indicating apparatus 50B, as the target 12B and the inclination sheet 88 are provided in the flat front surface 51b of the casing 51B, the inclination of the inclination sheet 88 is the inclination of the incident plane 12a of the target 12B. The measurement and installation data indicating apparatus 50B easily calculates the direction of the detection optical axis 55a and the projection optical axis 56b based on the obtained inclination of the inclination sheet 88. In the measurement and installation data indicating apparatus 50B of Embodiment 3, the center position Pc of the target 12B and the center position Sc of the symbol appearing plane 92 of the inclination sheet 88 are positioned on the projection optical axis (extended line) of the projector 56 and the detection optical axis 55a of the distance image sensor 55. In the measurement and installation data indicating apparatus 50B, as the direction orthogonal to the reference direction Db of the inclination sheet 88 is the detection optical axis 55a and the projection optical axis 56a, the measurement and installation data indicating apparatus 50B calculates the direction of the detection optical axis 55a and the projection optical axis 56a.

The measurement and installation data indicating apparatus 50B of Embodiment 3 of the measurement and installation data indicating apparatus according to the present invention easily and appropriately measures the target position such as the measurement and installation point 72.

Figure 26:
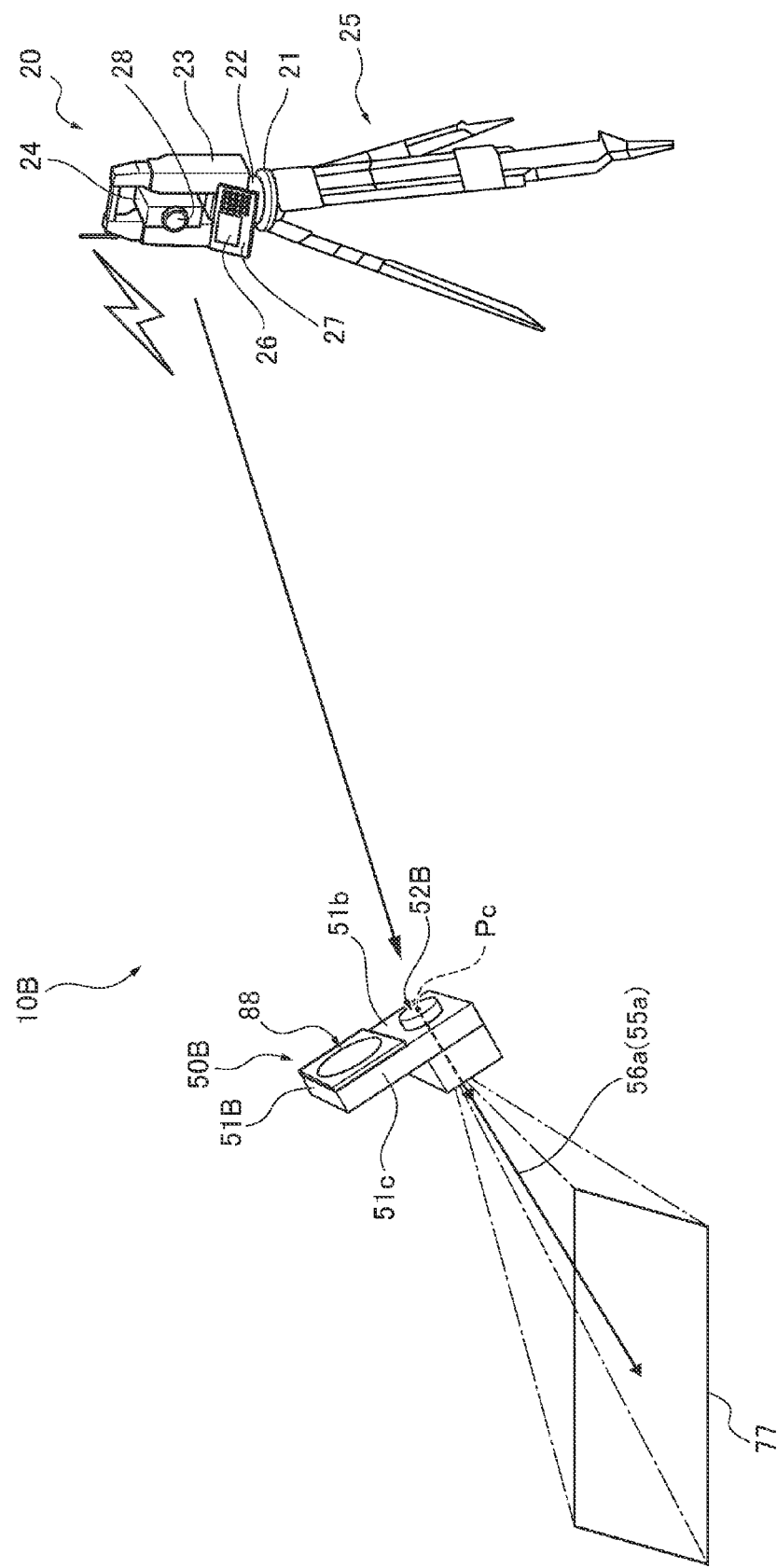
FIG. 26 is a schematic view illustrating a modified example of the measurement and installation data indicating apparatus 50B.

In the measurement and installation data indicating apparatus 50B of Embodiment 3, the target 12B and the inclination sheet 88 are arranged side by side on the front surface 51b of the casing 51B, and the center position Pc and the center position Sc are positioned on the detection optical axis 55a and the projection optical axis 56a (extended line). However, the positional relationship of the target 12B and the inclination sheet 88 is not limited to Embodiment 3. The positional relationship of these is appropriately set. As one example, the projector 56 and the target 12B may be provided in the casing 51B, such that the projection optical axis 56a of the projector 56 passes through the center position Pc of the target 12B on the rear surface 51c opposite to the front surface 51b, as illustrated in FIG. 26. As the reference direction Db (extending direction) of the inclination sheet 88 thereby becomes the detection optical axis 55a and the projection optical axis 56a, the direction of the detection optical axis 55a and the projection optical axis 56a is easily calculated based on the obtained inclination of the inclination sheet 88.

In the inclination sheet 88 of Embodiment 3, the circular symbol appearing plane 92 is provided in the thin base plate having a rectangular shape in a front view. However, the shape of the symbol appearing plane 92 is not limited to Embodiment 3 as long as the center position Sc is obtained through the image analysis. The shape of the symbol forming part 97 is not limited to the configuration of Embodiment 3 as long as the center position Mc of the inclination symbol 93 appearing on the symbol appearing plane 92 is obtained through the image analysis.

In the inclination sheet 88 of Embodiment 3, the inclination symbol 93 is displaced in the direction in which the visual line direction De inclines relative to the reference direction Db by arranging each symbol forming part 97 in a honeycomb manner at the intervals narrower than that of the light collecting parts 94a in every direction with the center position as a standard. However, the relationship between the inclination direction and the displacement direction of the inclination symbol 93 is appropriately set, and is not limited to the configuration of Embodiment 3 as long as the inclination symbol 93 is displaced according to the inclination state of the visual line direction De relative to the reference direction Db. As one example, the inclination symbol 93 is displaced in the direction opposite to the direction in which the visual line direction De inclines relative to the reference direction Db by arranging the symbol forming parts 97 at intervals slightly wider than that of the light collecting parts 94a in every direction with the center position as a standard.

In Embodiment 3, the direction of the inclination sheet 88 (base plate 91 and symbol appearing plane 92) is obtained from the center position Pc of the target 12B and the center position Sc of the symbol appearing plane 92 of the inclination sheet 88. However, it is not limited to the configuration of Embodiment 3. The shape of the base plate 91 and the symbol appearing plane 92 may be distinguished in the right and left direction and the up and down direction, or the base plate 91 and the symbol appearing plane 92 may be marked, so that the direction of the inclination sheet 88 is obtained only through the image analysis of the inclination sheet 88.

In Embodiment 3, the target 12B and the inclination sheet 88 are provided in the front surface 51b of the casing 51B. The inclination sheet 88 has a property in which the inclination symbol 93 is repeatedly seen on the symbol appearing plane 92 when an angle between the reference direction Db and the visual line direction De is large. For this reason, the target 12B may be provided with a cylindrical hood to control the target 12B in a collimation angle range to prevent the false detection of the inclination symbol 93. The inclination symbol 93 is thereby easily and reliably detected. The inclination symbol 93 is more reliably and easily detected by providing an illumination device on the rear surface (surface formed with no each symbol forming part 97 in image forming medium 96 of image forming layer 95) of the inclination sheet 88.

In Embodiment 3, the surveying instrument controller 37 of the surveying instrument 20 obtains the inclination (direction and degree) of the inclination sheet 88. However, the terminal controller 52B of the measurement and installment data indicating apparatus 50B may obtain the inclination. The configuration is not limited to Embodiment 3. In this case, the measurement and installation data indicating apparatus 50B obtains the image (data) of the inclination sheet 88 obtained by the surveying instrument controller 37, and may obtain the center position Pc, the center position Sc, and the center position Mc (data) obtained by the surveying instrument controller 37.

In the above embodiments, the measurement and installation data indicating apparatuses 50, 50A, 50B are each described as one embodiment of the measurement and installation data indicating apparatus according to the present invention. However, it is not limited to those in the above embodiments as long as the measurement and installation data indicating apparatus includes a distance image sensor that obtains distance image data in a predetermined range centered at a detection optical axis, a projector that projects an image on a projection plane in a predetermined range centered at a projection optical axis, an inclination data obtaining part that obtains inclination data on the detection optical axis and the projection optical axis relative to a vertical direction, a positional data obtaining part that obtains coordinate data on a present position and a target position, and a terminal controller that generates, based on the coordinate data, a target information image related to the target position and seen from the present position, wherein the terminal controller corrects the target information image to fit to a shape of the projection plane based on the distance image data obtained by the distance image sensor and the inclination data obtained by the inclination data obtaining part, and projects the corrected target information image by the projector.

In the above embodiments, the measurement and installation data indicating apparatus 50, 50A, 50B are each described as one embodiment of the measurement and installation data indicating method according to the present invention. However, it is not limited to those in the above embodiments as long as the measurement and installation data indicating method includes a step of obtaining distance image data in a predetermined range centered at a detection optical axis by the distance image sensor, a step of obtaining inclination data on the detection optical axis and a projection optical axis of the projector relative to a vertical direction by the inclination data obtaining part, a step of obtaining coordinate data on a present position and a target position by the positional data obtaining part, a step of correcting, based on the distance image data obtained by the distance image sensor and the inclination data obtained by the inclination data obtaining part, a target information image that is generated based on the coordinate data, related to the target position and seen from the present position to fit the target information image to the shape of the projection plane by the terminal controller, and a step of projecting the corrected target information image on a projection plane in a predetermined range centered at the projection optical axis by the projector.

In the above embodiments, the terminal controllers 52, 52A, 52B of the measurement and installation data indicating apparatuses 50, 50A, 50B execute the measurement and installation data indicating method. However, the controllers are not limited those in the above embodiments. The surveying instrument controller 37 of the surveying instrument 20 or another controller may execute the measurement and installation data indicating method. In this case, the surveying instrument controller 37 (another controller) may execute all control in the measurement and installation data indicating method, the terminal controllers 52, 52A, 52B only project the target information image 77 (Step S8) by controlling the driving of the projector 56, and the surveying instrument controller 37 (another controller) may execute the rest of the control.

In the above embodiments, the surveying instrument controller 37 of the surveying instrument 20 includes the target coordinate data. However, it is not limited to that in the above embodiments. The terminal controllers 52, 52A, 52B of the measurement and installation data indicating apparatuses 50, 50A, 50B may include the target coordinate data 71. In this case, the target coordinate data 71 may input from an external device through the communication part 57, input from an external device connected to the terminal controller 52, 52A, or 52B (measurement and installation data indicating apparatus 50, 50A, or 50B), or input by the operation to the operation part 59. The input target coordinate data 71 is stored in the memory 53 and is appropriately displayed on the display 58 under the control of the terminal controller 52, 52A, or 52B in the measurement and installation data indicating apparatus 50, 50A, 50B.

In the above Embodiments 1, 2, the detection optical axis 55a of the distance image sensor 55 is aligned with the projection optical axis 56a of the projector 56, and the detection optical axis 55a and the projection optical axis 56a are aligned with one axis (u-axis) of the inclination sensor 54 configured by the three-axis acceleration sensor. However, such a configuration is not limited to that in Embodiments 1, 2. The detection optical axis 55a and the projection optical axis 56a may be directed in different directions. As one example, one axis (u-axis) of the inclination sensor 54 is aligned with the vertical direction of the casing 51 in the reference posture, and the difference in the angle between the vertical direction, the detection optical axis 55a, and the projection optical axis 56a is preset to be registered. The inclinations of the detection optical axis 55a and the projection optical axis 56a are thereby obtained based on the detection of the inclination sensor 54.

In Embodiments 1, 2, the target 12 is configured by the all-around (360°) prism having on the entire circumference thereof a plurality of corner cube prisms. In Embodiment 3, the target 12B is configured by the single corner cube prism. However, the target is not limited to each of the embodiments. The target may be a retroreflection sheet or another member as long as it allows the surveying instrument 20 to measure a position. When the configuration in Embodiment 3 is used, the configuration of detecting the center position (Pc) of the target through the image analysis is adopted.

Although the measurement and installation data indicating apparatus of the present invention has been described based on the embodiments of the present invention, the present invention is not limited thereto. It should be appreciated that variations and additions may be made without departing from the scope of the present invention.

CROSS-REFERENCE TO RELATED APPLICATION

The present application is based on and claims priority from Japanese Patent Application No. 2014-174301, filed on Aug. 28, 2014, the disclosure of which is hereby incorporated by reference in its entirety.

The invention claimed is:

1. A measurement and installation data indicating apparatus comprising:
a distance image sensor that obtains distance image data in a predetermined range centered at a detection optical axis;
a projector that projects an image on a projection plane in a predetermined range centered at a projection optical axis;
an inclination data obtaining part that obtains inclination data on the detection optical axis and the projection optical axis relative to a vertical direction;
a positional data obtaining part that obtains coordinate data on a present position and a target position; and
a terminal controller that generates, based on the coordinate data, a target information image related to the target position and seen from the present position, wherein
the terminal controller corrects the target information image to fit to a shape of the projection plane based on the distance image data obtained by the distance image sensor and the inclination data obtained by the inclination data obtaining part, and projects the corrected target information image by the projector.

2. The measurement and installation data indicating apparatus according to claim 1, wherein the terminal controller fits the target information image to the shape of the projection plane by associating the projected target information image with the coordinate data when the projection plane is seen in a direction orthogonal to the projection plane.

3. The measurement and installation data indicating apparatus according to claim 1, wherein the detection optical axis is aligned with the projection optical axis.

4. The measurement and installation data indicating apparatus according to claim 1, wherein
the target position is a measurement and installation point, and
the terminal controller generates a measurement and installation image including a target marking symbol showing a position of the measurement and installation point as the target information image, and projects the measurement and installation image by the projector.

5. The measurement and installation data indicating apparatus according to claim 1, wherein
the target position is a structure, and
the terminal controller generates a structure image including a target indicating picture showing a position and a shape of the structure, and projects the structure image by the projector.

6. The measurement and installation data indicating apparatus according to claim 1, wherein
the terminal controller generates, as the target information image, a guide image that guides to the target position from the present position based on the coordinate data when the target position does not present in a range in which the projector projects an image on the projection plane, and projects the guide image by the projector.

7. The measurement and installation data indicating apparatus according to claim 1, wherein
a projection maximum distance at which the projector projects the target information image is set in the terminal controller, and
the terminal controller generates, based on the distance image data obtained by the distance image sensor, the target information image by partially omitting the target information image in a part of the projection plane exceeding the projection maximum distance, and projects the target information image in which the part exceeding the projection maximum distance is omitted by the projector.

8. The measurement and installation data indicating apparatus according to claim 1, further comprising:
a casing in which the distance image sensor, the projector, the inclination data obtaining part, the positional data obtaining part, and the terminal controller are provided; and
an azimuth sensor that obtains an azimuth of a reference direction in the casing, wherein
the terminal controller generates the target information image with the azimuth in the reference direction obtained by the azimuth sensor as a standard.

9. The measurement and installation data indicating apparatus according to claim 1, wherein
the coordinate data is horizontal coordinate data, and
the terminal controller fits the target information image to the shape of the projection plane by associating the projected target information image with the horizontal coordinate data when the projection plane is seen from above in the vertical direction.

10. The measurement and installation data indicating apparatus according to claim 1, wherein
the coordinate data is ceiling coordinate data in a ceiling, and
the terminal controller fits the target information image to the shape of the projection plane by associating the projected target information image with the ceiling coordinate data when the ceiling is seen from underneath in the vertical direction with the ceiling as the projection plane.

11. The measurement and installation data indicating apparatus according to claim 1, wherein
the coordinate data is wall coordinate data in a wall rising from a floor, and
the terminal controller fits the target information image to the shape of the projection plane by associating the projected target information image with the wall coordinate data when the wall is seen in a direction orthogonal to the wall with the wall as the projection plane.

12. The measurement and installation data indicating apparatus according to claim 1, wherein
the positional data obtaining part includes a target with which a positon is measured by a surveying instrument, and a communication part that exchanges data between the surveying instrument and the terminal controller, and
the terminal controller obtains the coordinate data on the target position through the communication part, and obtains data on the positon of the target measured by the surveying instrument through the communication part, so as to use the obtained data on the target as the coordinate data of the present position.

13. The measurement and installation data indicating apparatus according to claim 1, wherein the inclination data obtaining part is an inclination sensor that detects an own inclination relative to the vertical direction.

14. The measurement and installation data indicating apparatus according to claim 1, wherein the inclination data obtaining part is an inclination sheet that displaces a position of an inclination symbol according to an inclination relative to a visual line direction.

15. A measurement and installation data indicating method that is executed by a measurement and installation information indicating apparatus including a distance image sensor, a projector, an inclination data obtaining part, a positional data obtaining part, and a terminal controller, the method comprising:

a step of obtaining distance image data in a predetermined range centered at a detection optical axis by the distance image sensor;

step of obtaining inclination data on the detection optical axis and a projection optical axis of the projector relative to a vertical direction by the inclination data obtaining part;

a step of obtaining coordinate data on a present position and a target position by the positional data obtaining part;

a step of correcting, based on the distance image data obtained by the distance image sensor and the inclination data obtained by the inclination data obtaining part, a target information image that is generated based on the coordinate data, related to the target position and seen from the present position to fit the target information image to the shape of the projection plane by the terminal controller; and a step of projecting the corrected target information image on a projection plane in a predetermined range centered at the projection optical axis by the projector.

* * * * *